(12) United States Patent
Osawa et al.

(10) Patent No.: US 11,600,055 B2
(45) Date of Patent: Mar. 7, 2023

(54) APPARATUS, METHOD, AND STORAGE MEDIUM

(71) Applicant: CANON KABUSHIKI KAISHA, Tokyo (JP)

(72) Inventors: Kazutaka Osawa, Kanagawa (JP); Takahiro Sato, Kanagawa (JP); Takeaki Itsuji, Kanagawa (JP); Nao Nakatsuji, Kanagawa (JP); Mayu Ishikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 17/212,683

(22) Filed: Mar. 25, 2021

(65) Prior Publication Data

US 2021/0312202 A1    Oct. 7, 2021

(30) Foreign Application Priority Data

Apr. 7, 2020  (JP) .............................. JP2020-069430

(51) Int. Cl.
| | | |
|---|---|---|
| *G06V 10/143* | (2022.01) | |
| *G06T 7/246* | (2017.01) | |
| *G06K 9/62* | (2022.01) | |
| *G06T 7/215* | (2017.01) | |
| *H04N 5/225* | (2006.01) | |

(Continued)

(52) U.S. Cl.
CPC .......... *G06V 10/143* (2022.01); *G06K 9/6256* (2013.01); *G06K 9/6267* (2013.01); *G06T 7/215* (2017.01); *G06T 7/248* (2017.01); *G06V 10/273* (2022.01); *G06V 10/40* (2022.01); *H04N 5/2256* (2013.01); *G06N 20/00* (2019.01); *G06T 2207/20081* (2013.01); *G06V 2201/05* (2022.01)

(58) Field of Classification Search
CPC .... G06K 9/6256; G06K 9/6267; G06V 20/52; G06V 40/20; G06V 10/143; G06V 10/40; G06V 40/10; G06V 2201/05; G06V 10/273; G06T 2207/20081; G06T 7/215; G06T 7/248; G06N 20/00; H04N 5/2256
See application file for complete search history.

(56) References Cited

U.S. PATENT DOCUMENTS

| | | | | |
|---|---|---|---|---|
| 2009/0180124 A1* | 7/2009 | Chen | ...................... | G01H 9/002 356/496 |
| 2010/0271494 A1* | 10/2010 | Miyasako | ............... | G06T 7/215 348/208.1 |

(Continued)

FOREIGN PATENT DOCUMENTS

| | | |
|---|---|---|
| JP | 2007218661 A | 8/2007 |
| JP | 2013021569 A | 1/2013 |

(Continued)

*Primary Examiner* — Pinalben Patel
(74) *Attorney, Agent, or Firm* — Canon U.S.A., Inc., IP Division

(57) ABSTRACT

An apparatus includes an extract unit configured to extract features of a first image based on an electromagnetic wave in a first frequency band, an acquire unit configured to acquire motion information about the features, a classify unit configured to classify the features into a first group and a second group based on the motion information, and a remove unit configured to remove, from the first image, a signal corresponding to the feature belonging to the first group.

27 Claims, 18 Drawing Sheets

(51) Int. Cl.
  *G06V 10/40* (2022.01)
  *G06V 10/26* (2022.01)
  *G06N 20/00* (2019.01)

(56) References Cited

U.S. PATENT DOCUMENTS

2016/0253820 A1* 9/2016 Jeanne .................. G06T 7/90
                                                 382/107
2017/0300780 A1* 10/2017 Baba ................... G01S 13/867
2018/0158299 A1*  6/2018 Bogdan ............ G08B 13/19656
2021/0104052 A1*  4/2021 Hayashi ................ G06T 7/248
2021/0398281 A1* 12/2021 Lys .................... H04N 5/23229

FOREIGN PATENT DOCUMENTS

JP     2014200065 A    10/2014
JP     2016050935 A     4/2016

* cited by examiner

411

412

413

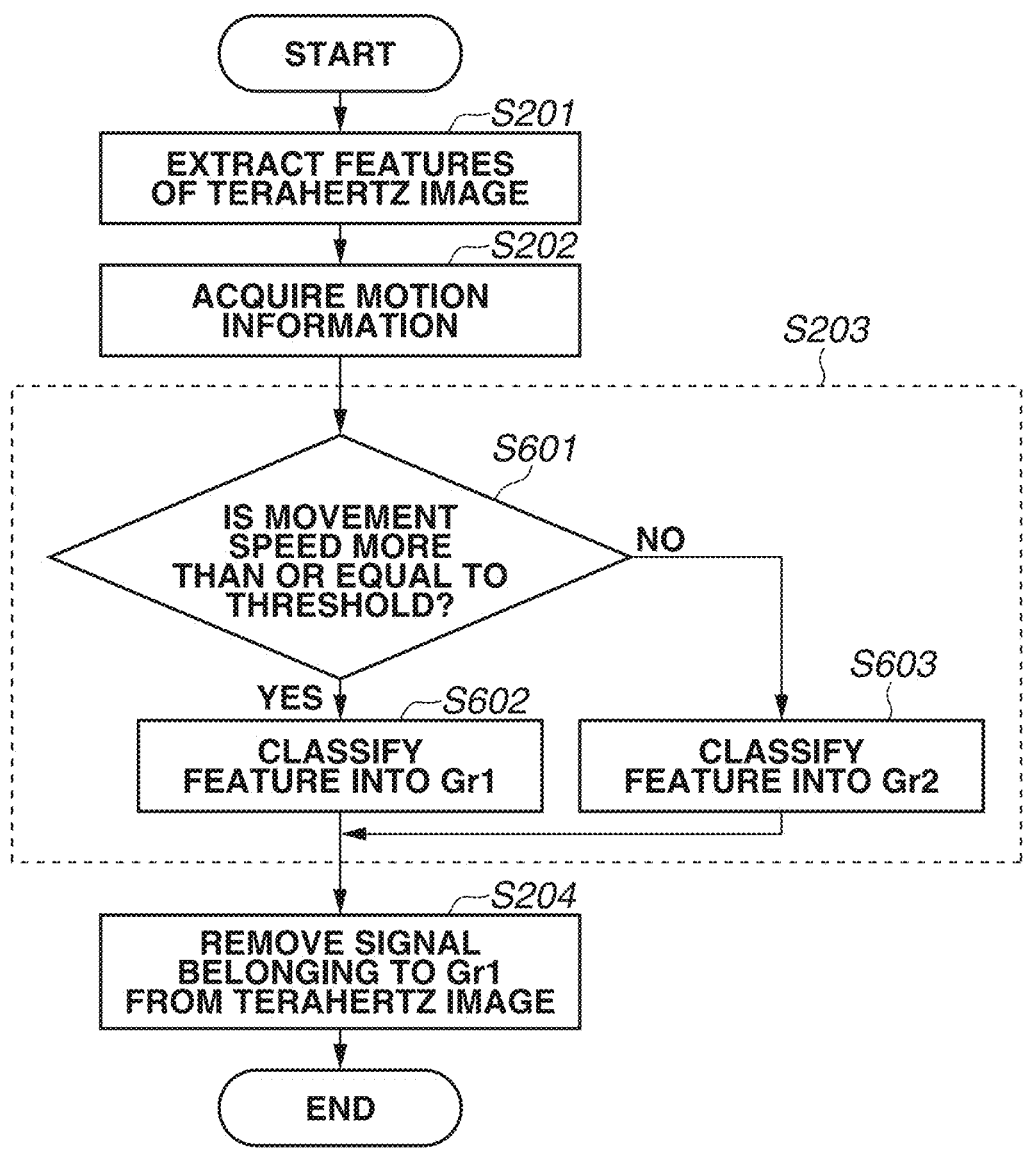

701

702

703

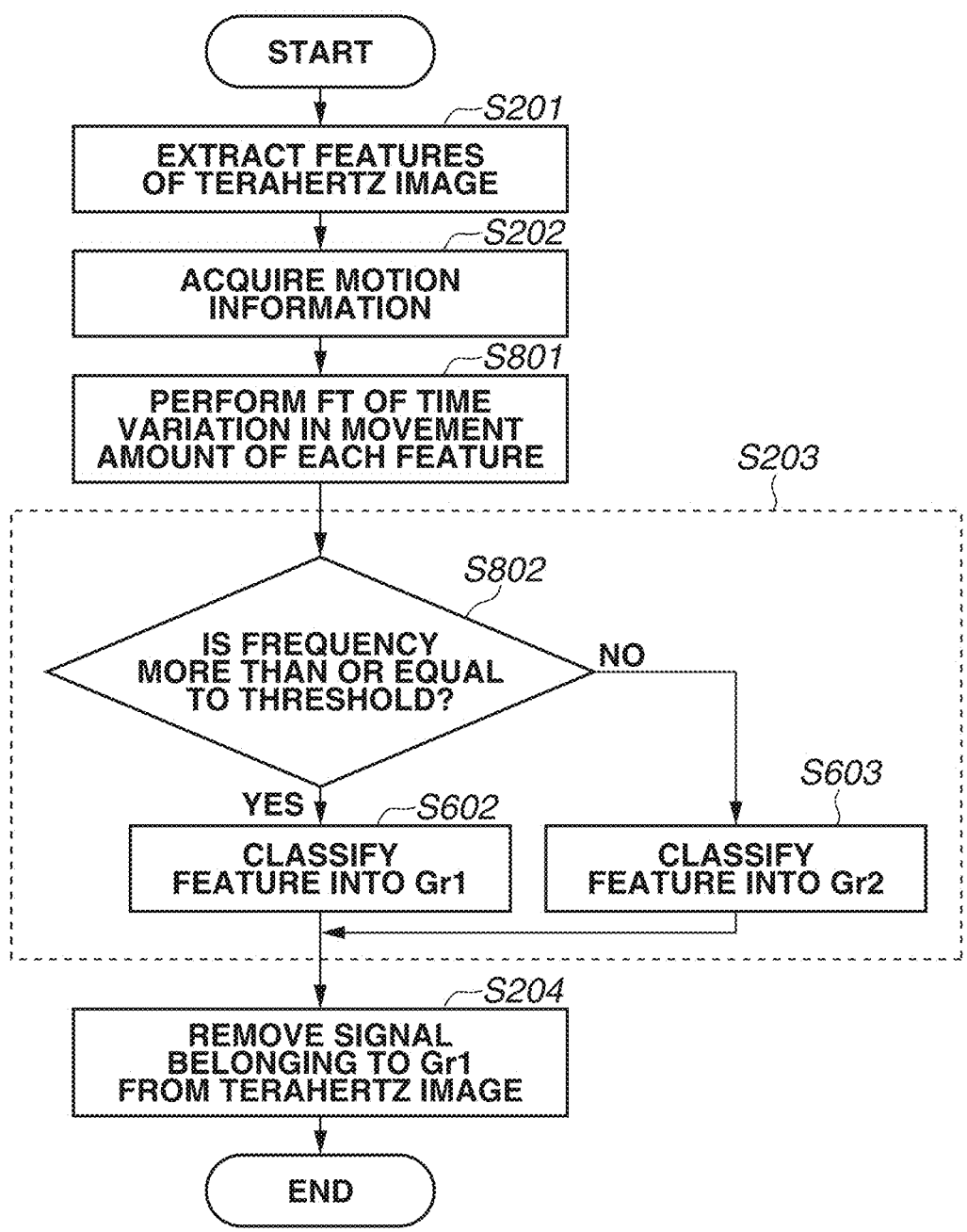

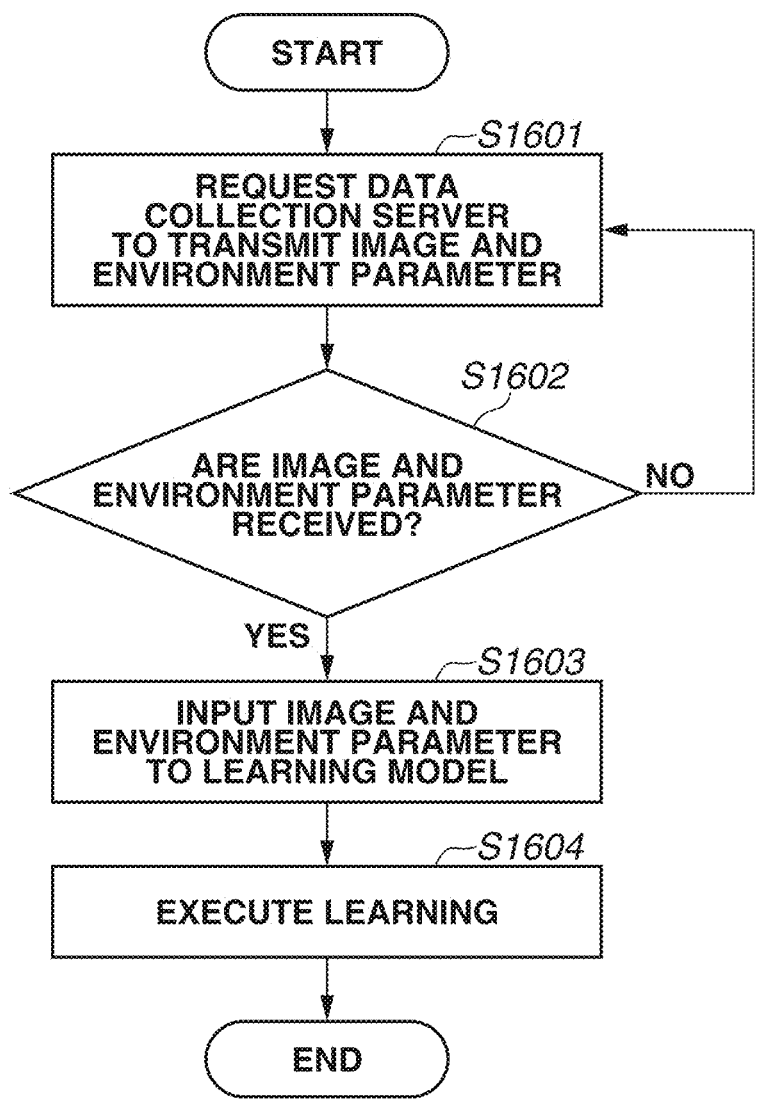

LEARNING PHASE

ESTIMATION PHASE

APPARATUS, METHOD, AND STORAGE MEDIUM

BACKGROUND OF THE DISCLOSURE

Field of the Disclosure

The aspect of the embodiments relates to an apparatus, a method, and a storage medium.

Description of the Related Art

Japanese Unexamined Patent Application Publication (Translation of PCT application) No. 2007-517275 discusses a method for causing each person to stop at a predetermined position, for example, at a gate for controlling each person to enter a building or leave from the building, or at an entrance of an escalator, irradiating the person with an electromagnetic wave, and detecting an object owned by the person based on the result of reception of the electromagnetic wave reflected by the person.

SUMMARY OF THE DISCLOSURE

An apparatus according to an aspect of the embodiments includes, an extract unit configured to extract features of a first image based on an electromagnetic wave in a first frequency band, an acquire unit configured to acquire motion information about the features of the first image, a classify unit configured to classify the features of the first image into a first group and a second group based on the motion information, and a remove unit configured to remove, from the first image, a signal corresponding to a feature of the first image that belongs to the first group.

Further features of the disclosure will become apparent from the following description of exemplary embodiments with reference to the attached drawings.

BRIEF DESCRIPTION OF THE DRAWINGS

FIG. 6 is a flowchart illustrating an operation of the camera system according to the first exemplary embodiment.

FIG. 8 is a flowchart illustrating an operation of a camera system according to a second exemplary embodiment.

FIG. 16 is a flowchart illustrating a learning phase according to the fourth exemplary embodiment.

DESCRIPTION OF THE EMBODIMENTS

Figure 1:
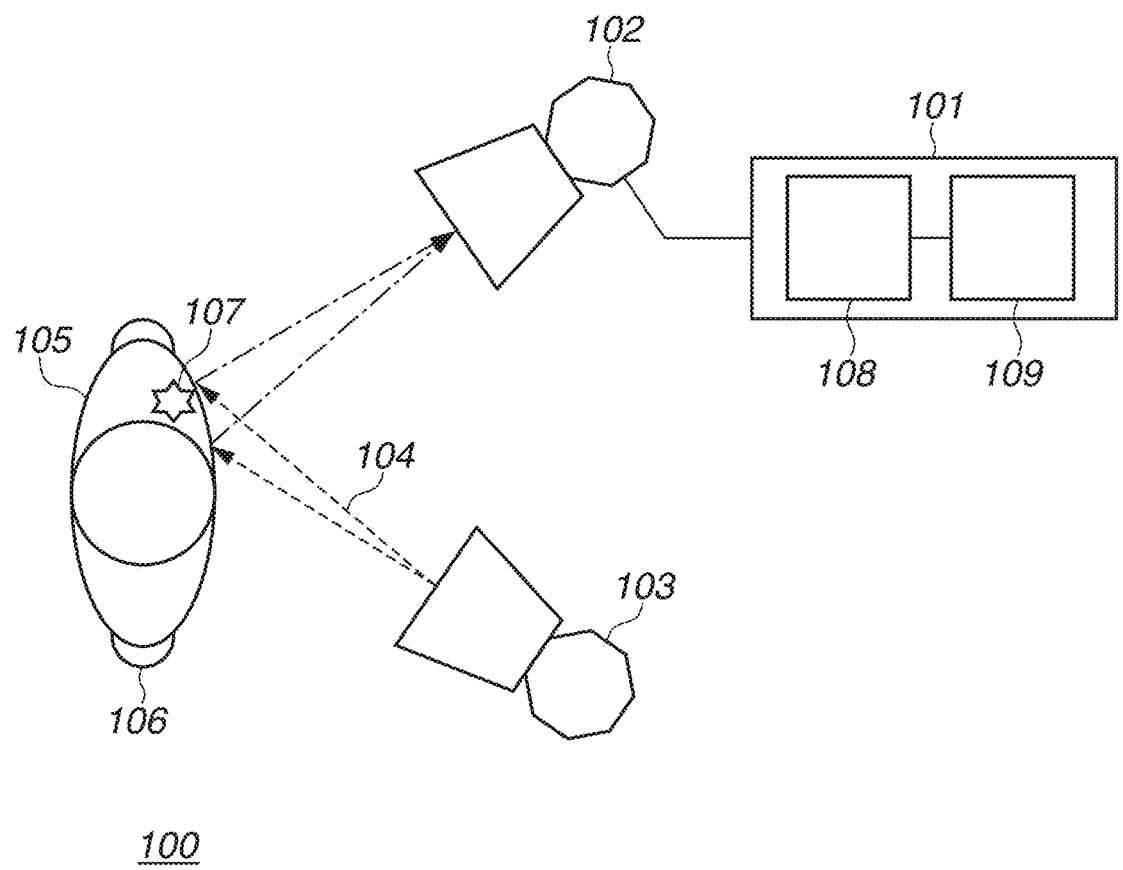
FIG. 1 illustrates a camera system according to a first exemplary embodiment.

Exemplary embodiments of the disclosure will be described in detail below with reference to the accompanying drawings. The following exemplary embodiments are intended to embody the technical idea of the disclosure, but do not limit the disclosure. While a plurality of features is described in the following exemplary embodiments, not all combinations of features described in the exemplary embodiments are essential to the disclosure and the features may be arbitrarily combined. The following exemplary embodiments illustrate an example where an active camera system including a lighting unit is used as a camera system. However, a passive camera system including no lighting unit may also be used.

Some of the sizes and positional relationships of the members illustrated in the drawings are exaggerated for clarity of description. In the following description, the same components are denoted by the same reference numerals, and descriptions thereof may be omitted.

Inventors have found that in a case where a person wearing clothes is checked based on an image captured by using an electromagnetic wave, the absorption or reflection of the electromagnetic wave by the clothes causes noise, which deteriorates the image quality. The deterioration in the image quality may also cause a deterioration in the accuracy of detecting a dangerous object concealed under the clothes. The present exemplary embodiment is directed to providing a technique for reducing noise in an image based on an electromagnetic wave.

A first exemplary embodiment illustrates an example where a camera system that uses an electromagnetic wave is used as an application example of an image processing apparatus. The present exemplary embodiment illustrates a case where a terahertz wave is used as the electromagnetic wave. The wavelength of the terahertz wave is longer than that of visible light and infrared light, and thus the terahertz wave is hardly affected by scattering of light from an object and has high transmissivity with respect to many materials. In contrast, the wavelength of the terahertz wave is shorter than that of a millimeter wave, and thus it is expected that the terahertz wave can be applied to an electromagnetic camera with a high resolution. It is also expected that an image inspection method using the terahertz wave, which has the above-described features, can be used as a safe image inspection method, in place of X-rays. For example, it is expected that the image inspection method using the terahertz wave can be applied to a security check or monitoring technique in a public place. Typically, the terahertz wave is an electromagnetic wave having a signal in any frequency band, or including a single frequency, in a range from 0.1 THz to 30 THz. While the present exemplary embodiment illustrates an example where the terahertz wave has a frequency of approximately 0.4 THz, the disclosure is not limited to this example.

FIG. 1 illustrates the camera system according to the first exemplary embodiment. The camera system includes an image processing apparatus 101, a reception unit 102, and a radiation unit 103. The reception unit 102 detects a terahertz wave from an object 106, and outputs a signal based on the terahertz wave. The reception unit 102 can also be referred to as an image capturing unit or a camera. The radiation unit 103 radiates a terahertz wave 104. The radiation unit 103 can also be referred to as a lighting unit. As a detailed configuration of the radiation unit 103, a configuration discussed in Japanese Patent Application Laid-Open No. 2014-200065 can be applied. The image processing apparatus 101 processes the signal received from the reception unit 102. In this case, the image processing apparatus 101 includes an image generation unit 108 and a processing unit 109. However, image generation processing may be performed by a single processing unit, or at least a part of the processing may be performed on a cloud system.

The object 106 is a person. In this case, a coating material 105 may be clothing including fiber or leather. A concealed object 107 may be any article, such as a dangerous object made of metal or ceramics. The object 106 is not limited to a person, but instead may be an article. In this case, the coating material 105 may be a wrapping, a packaging, or the like made of, for sample, paper, cloth, or plastics. In the present exemplary embodiment, the concealed object 107 is held by the object 106 and is covered with the coating material 105. The concealed object 107 is an object to be detected in the camera system.

A frequency range of the terahertz wave to be used will now be described. In many cases, the coating material 105 is made of a material, such as clothing, which has high transmissivity with respect to electromagnetic waves of up to approximately 1 THz. In order to obtain an image resolution with which the shape of the concealed object 107 can be identified, in one embodiment, an appropriate wavelength is used. The frequency of the terahertz wave with an appropriate wavelength is approximately 0.3 THz. In one embodiment, the terahertz wave having a frequency range from approximately 0.3 THz to approximately 1 THz is used, accordingly. Thus, the terahertz wave used in the present exemplary embodiment has a frequency of approximately 0.4 THz as described above.

An operation of the camera system illustrated in FIG. 1 will be described. The terahertz wave 104 is radiated from the radiation unit 103. The object 106, the coating material 105, and the concealed object 107 are irradiated with the terahertz wave 104. The most part of the terahertz wave 104 is transmitted through the coating material 105 and is reflected by the surface of the concealed object 107 and by the surface of the object 106. The reception unit 102 receives the reflected terahertz wave. The reception unit 102 outputs a signal based on the reflected terahertz wave. The image generation unit 108 generates image data from the signal based on the terahertz wave. The processing unit 109 processes the image data output from the image generation unit 108.

In this case, a part of the radiated terahertz wave 104 is reflected by the coating material 105. In other words, the reflected terahertz wave 104 detected by the reception unit 102 includes information about the coating material 105. The processing unit 109 performs processing for removing the signal based on the terahertz wave reflected by the coating material 105 from the image data generated by the image generation unit 108.

Figure 3A:
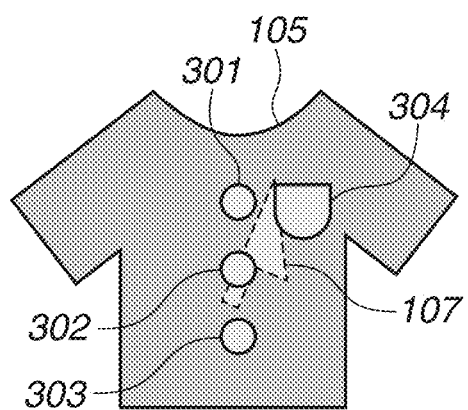
FIGS. 3A to 3D illustrate the camera system according to the first exemplary embodiment.
Figure 3B:
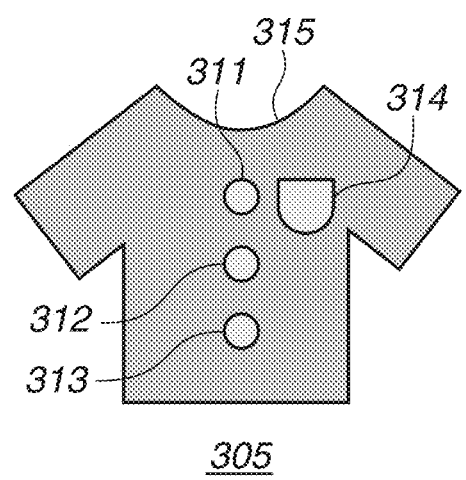
Figure 3C:
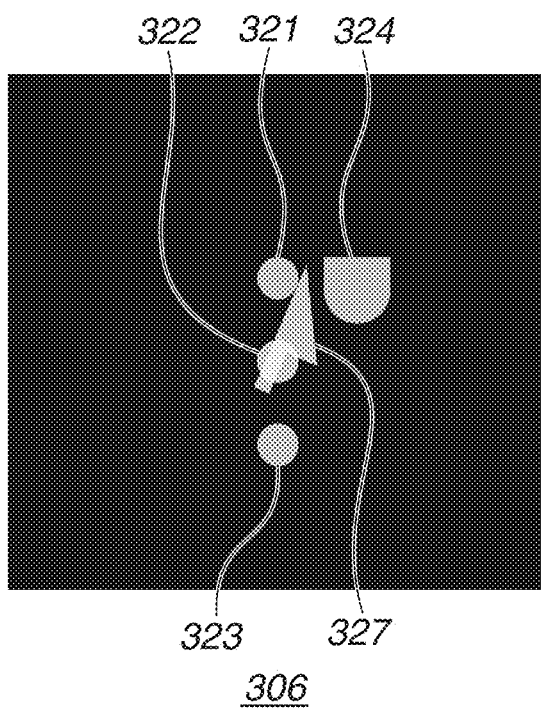

This processing will be described with reference to FIGS. 3A to 3C. FIG. 3A is a schematic diagram illustrating a case where the object 106, the coating material 105, and the concealed object 107 illustrated in FIG. 1 are viewed from the front side. The coating material 105 is clothing. The clothing has a plurality of decorative objects 301 to 304. The decorative objects 301, 302, and 303 are, for example, buttons. The decorative object 304 is, for example, a pocket. As illustrated in FIG. 3A, the concealed object 107 is covered with the coating material 105. FIGS. 3B and 3C schematically illustrate images of the object 106, the coating material 105, and the concealed object 107 illustrated in FIG. 1 when the images are captured from the front side. FIG. 3B is a schematic diagram illustrating an image 305 when captured with visible light. FIG. 3C is a schematic diagram illustrating an image 306 when captured with a terahertz wave. In FIGS. 3A to 3C, the illustration of the object 106, such as a person, is omitted for ease of explanation.

The image 305 illustrated in FIG. 3B indicates a coating material image 315 and a plurality of decorative object images 311 to 314. The coating material image 315 and the plurality of decorative object images 311 to 314 are visible light images of the coating material 105 and the plurality of decorative objects 301 to 304 illustrated in FIG. 3A. In contrast, the visible light image corresponding to the concealed object 107 illustrated in FIG. 3A is not illustrated in FIG. 3B. This is because the visible light is reflected and absorbed by the coating material 105, which makes it difficult to check the concealed object 107 covered with the coating material 105.

The image 306 illustrated in FIG. 3C indicates a plurality of decorative object images 321 to 324 and a concealed object image 327. The plurality of decorative object images 321 to 324 and the concealed object image 327 are terahertz images of the plurality of decorative objects 301 to 304 and the concealed object 107 illustrated in FIG. 3A. The terahertz image corresponding to the coating material 105 illustrated in FIG. 3A is not illustrated in FIG. 3C. This is because, while the terahertz wave is transmitted through the coating material 105, the decorative objects 301 to 304 and the concealed object 107 can be reflecting objects for the terahertz wave.

The coating material 105 is made of, for example, fiber. The electromagnetic wave in the terahertz wave band has high transmittance with respect to fiber. In contrast, the electromagnetic wave in the terahertz wave band has a higher reflectance for the decorative objects 301 to 303 and the decorative object 304, compared with the coating material 105. For example, if the decorative objects 301 to 303 are buttons, the electromagnetic wave in the terahertz wave band has a high reflectance for the material of the buttons in many cases. Further, since the electromagnetic wave in the terahertz wave band locally has a high reflectance at, for example, wrinkles in the clothing, the electromagnetic wave in the terahertz wave band has a high reflectance for the decorative object 304, such as a pocket. The terahertz wave is transmitted through the coating material 105 and is reflected by the decorative objects 301 to 304 and the concealed object 107, accordingly. Thus, the image 306 is an image obtained by superimposing an image corresponding to the terahertz wave reflected by the concealed object 107 and an image corresponding to the terahertz wave reflected by each of the decorative objects 301 to 304. In the present exemplary embodiment, the concealed object 107 is an object to be detected. In this regard, inventors have found that although the concealed object 107 can be detected by capturing an image using a terahertz wave, undesired information, such as information about the plurality of decorative object images 321 to 324, is inevitably superimposed as noise. The inventors have also found that the fact that the object 106 and the concealed object 107 are moving at different speeds or cycles relatively to the coating material 105 can be used to remove noise. Next, noise reduction processing to be performed by the image processing apparatus 101 will be described.

Figure 2:
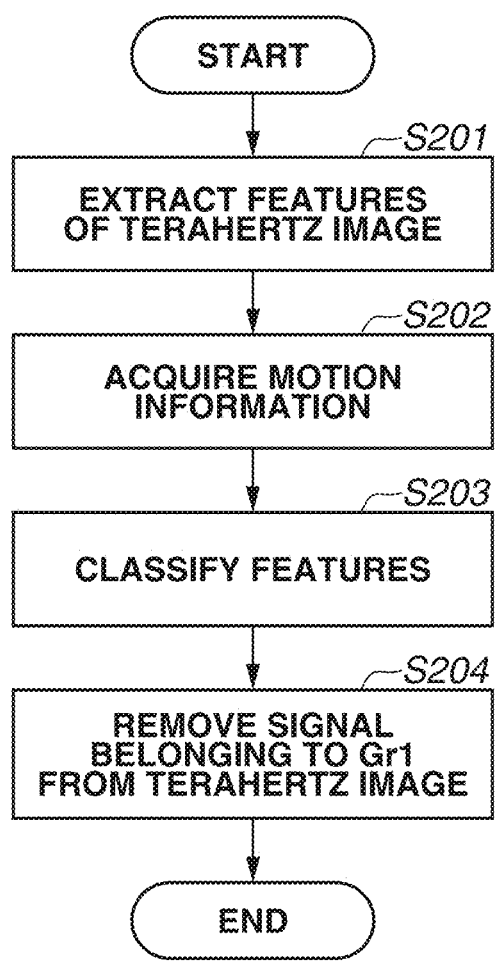
FIG. 2 is a flowchart illustrating an operation of the camera system according to the first exemplary embodiment.
Figure 3D:
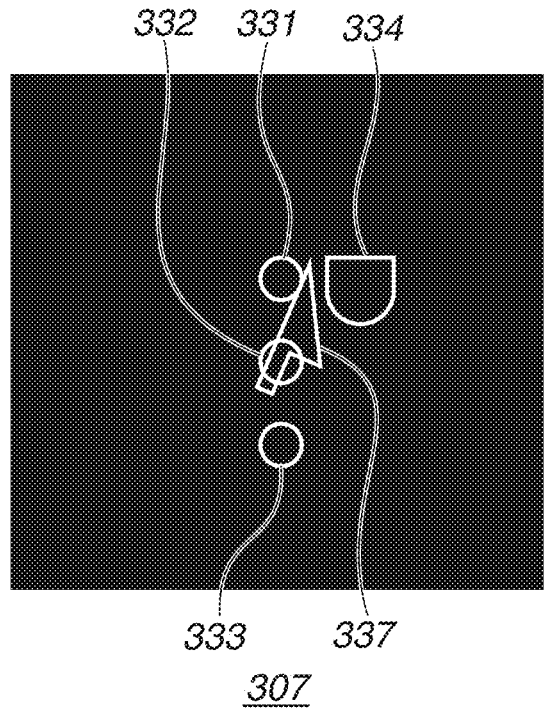

Processing performed on the image acquired as described above will be described with reference to FIG. 2. FIG. 2 is a flowchart illustrating processing performed in the image processing apparatus 101. This flowchart is started after the processing unit 109 receives image data. In step S201, features of a terahertz image are extracted. Examples of the features may include an edge, an angle, a singular point, and a contour. Other examples of the features may include a figure and an area extracted by identifying edges or corners. As an example of the features, an area obtained as a result of performing contour extraction using a Laplacian filter is used. Any other known technique may also be used to extract the features. FIG. 3D is a schematic diagram illustrating an image 307 obtained by processing the image 306 illustrated in FIG. 3C and performing contour extraction to identify the area. In other words, the image 307 illustrated in FIG. 3D is an image indicating the features. A feature 331 illustrated in FIG. 3D is generated from the decorative object image 321 illustrated in FIG. 3C. A feature 332 illustrated in FIG. 3D is generated from the decorative object image 322 illustrated in FIG. 3C. A feature 333 illustrated in FIG. 3D is generated from the decorative object mage 323 illustrated in FIG. 3C. A feature 334 illustrated in FIG. 3D is generated from the decorative object image 324 illustrated in FIG. 3C. A feature 337 illustrated in FIG. 3D is generated from the concealed object image 327 illustrated in FIG. 3C. A contour is extracted from each image and the area of each image is extracted.

In step S202, motion information about the extracted features is acquired. In this case, the motion information can also be referred to as a feature amount. The motion information is, for example, a velocity vector of each feature. The velocity vector can be extracted from a movement vector and a frame rate of the reception unit 102. As a unit for extracting the movement vector, a unit that extracts a movement amount from two or more images can be used. For example, the movement vector can be extracted from two temporally consecutive images. The images to be used for extraction are not limited to two consecutive images, but instead may be two images to be appropriately selected, or may be moving images. As a method for extracting the movement vector, for example, a block matching method can be suitably used. This extraction processing will be described with reference to FIGS. 4A to 4C.

Figure 4A:
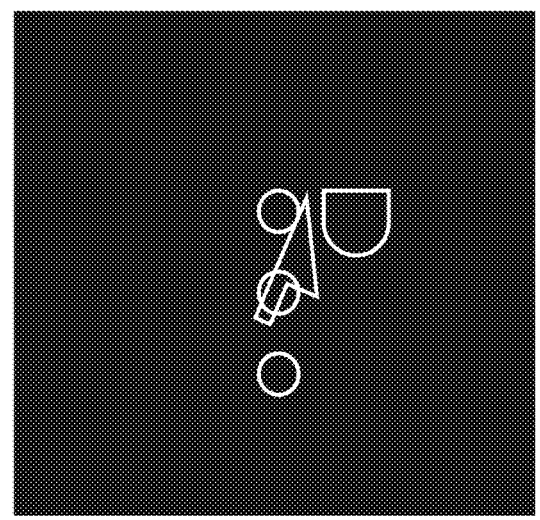
FIGS. 4A to 4C illustrate the camera system according to the first exemplary embodiment.
Figure 4B:
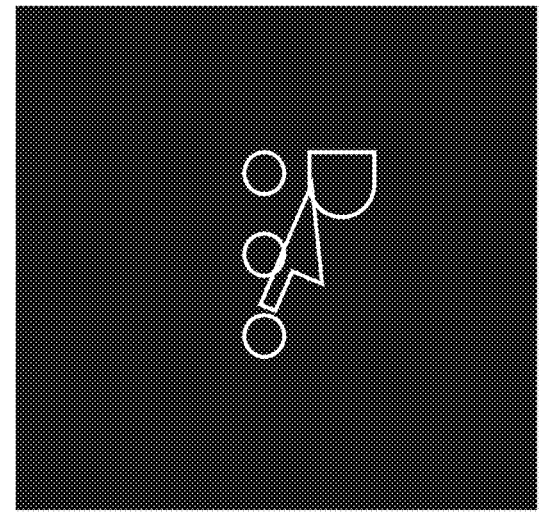
Figure 4C:
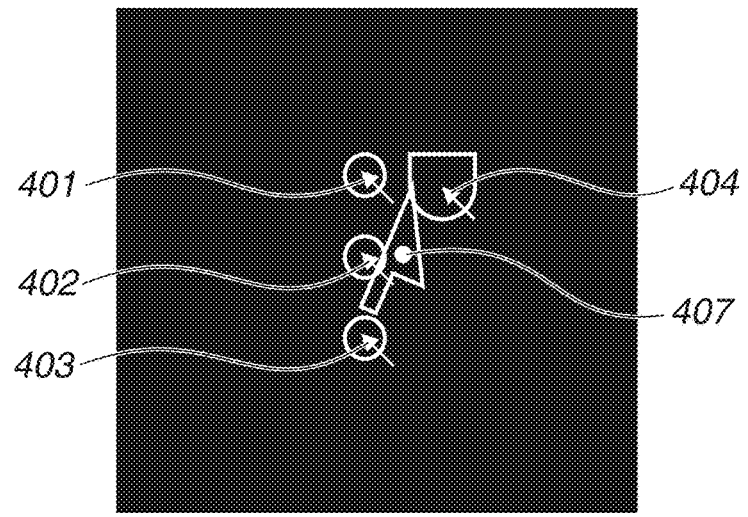

FIGS. 4A to 4C illustrate the movement vector extraction processing. Each movement vector is extracted by tracking. FIG. 4A illustrates an image 411, which is one frame at a certain time. FIG. 4B illustrates an image 412, which is one frame at a time after the certain time. In this case, the image 411 illustrated in FIG. 4A corresponds to the image 307 indicating one of the features illustrated in FIG. 3D. FIG. 4C illustrates an image 413 indicating movement vectors extracted from the image 411 and the image 412. In the image 413, the direction and magnitude (speed) of each vector are indicated by arrows. A vector 401 is a movement vector for the feature 331 in the image 307. A vector 402 is a movement vector for the feature 332 in the image 307. A vector 403 is a movement vector for the feature 333 in the image 307. A vector 404 is a movement vector for the feature 334 in the image 307. A vector 407 is a movement vector for the feature 337 in the image 307. The magnitude of each vector indicates the movement speed of each feature. In FIG. 4C, for example, the magnitude of each of the vectors 401 to 404 is greater than 0, and the vectors 401 to 404 are each indicated by an arrow. The magnitude of the vector 407 is 0. The vector 407 is represented by a point. In the case of extracting movement vectors, the movement vectors are extracted from images of two frames in the present exemplary embodiment, but instead can be extracted from images of a plurality of frames. The movement speed can be extracted from a movement amount and a frame rate.

Figure 5:
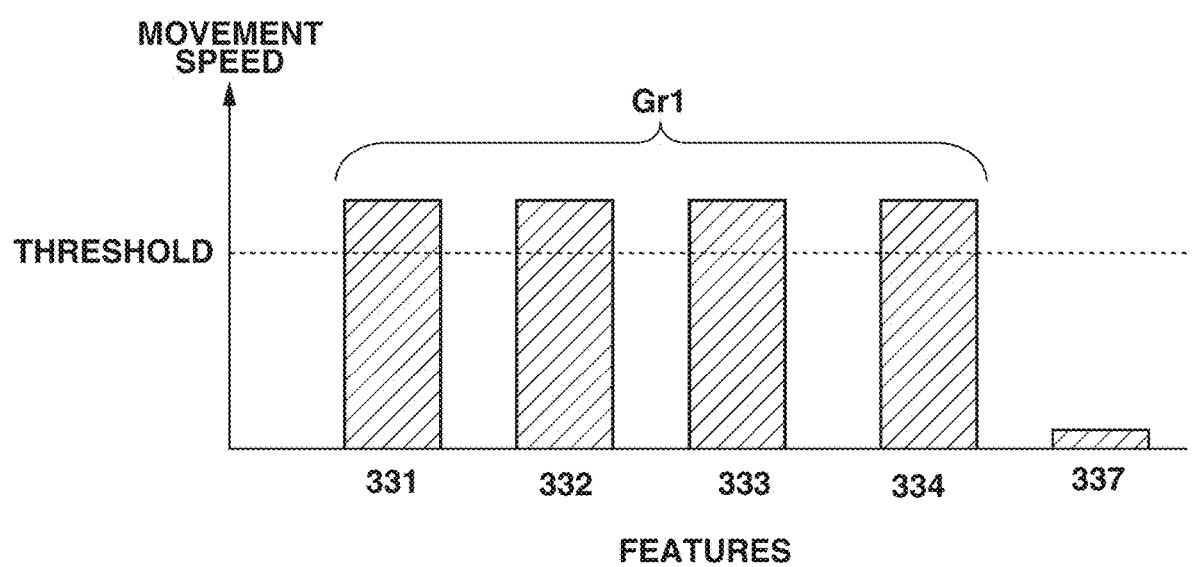
FIG. 5 is a schematic graph illustrating the camera system according to the first exemplary embodiment.

In step S203, the features are classified based on the extraction result. In this case, the features are classified into Group 1 (Gr1) and Group 2 (Gr2) that is different from Group 1. FIG. 5 is a schematic graph illustrating the classification of features according to the present exemplary embodiment. Specifically, FIG. 5 illustrates the movement speed of each feature in a bar graph. The movement speed can be replaced with a movement amount.

The features 331 to 334 are signals based on the decorative objects 301 to 304 attached to the coating material 105. The movement speed of each of the decorative objects 301 to 304 is more than or equal to a threshold, and thus these features are classified into Group 1 to be corrected. The feature 337 is a signal based on the concealed object 107. The movement speed of the feature 337 is less than the threshold, and thus the feature 337 is not classified into Group 1 to be corrected, but is classified into Group 2.

FIG. 6 is a flowchart in which the classification step S203 illustrated in FIG. 2 is illustrated in more detail. Step S203 is a feature classification step. Step S203 includes steps S601 to S603. In step S203, motion information about each feature acquired in step S202 is used. Specifically, in step S601, it is determined whether the movement speed of the feature is more than or equal to a threshold to classify the feature. If the movement speed of the feature is more than equal to the threshold (YES in step S601), the processing proceeds to step S602. In step S602, the feature is classified into Gr1. If the movement speed of the feature is less than the threshold (NO in step S601), the processing proceeds to step S603. In step S603, the feature is classified into Gr2. The determination and classification processing can be performed on all the extracted features, or can be performed on any of the features. In the present exemplary embodiment, for example, a walking speed of approximately 4 km/h, or a time variation of approximately 1 mm/s in the breast of the person due to breathing is set as the threshold. In addition, the threshold can be set based on the number or distribution of features with a large movement amount. In the case of FIG. 5, the features 331 to 334 are classified into Gr1, and the feature 337 is classified into Gr2.

After that, as illustrated in FIGS. 2 and 6, in step S204, the signal belonging to Gr1 is removed from the terahertz image. This removal processing is performed by, for example, replacing the signal belonging to Gr1 with a signal located at the same coordinates in another image. The other image to be used is not limited to a temporally consecutive image (continuous frame), and the temporal relationship between images is not particularly limited. If undesired objects, such as the decorative objects 301 to 304, are superimposed with the concealed object 107, an appropriate image is selected based on the result of tracking each feature. This processing will be described in detail with reference to FIGS. 7A to 7C.

Figure 7A:
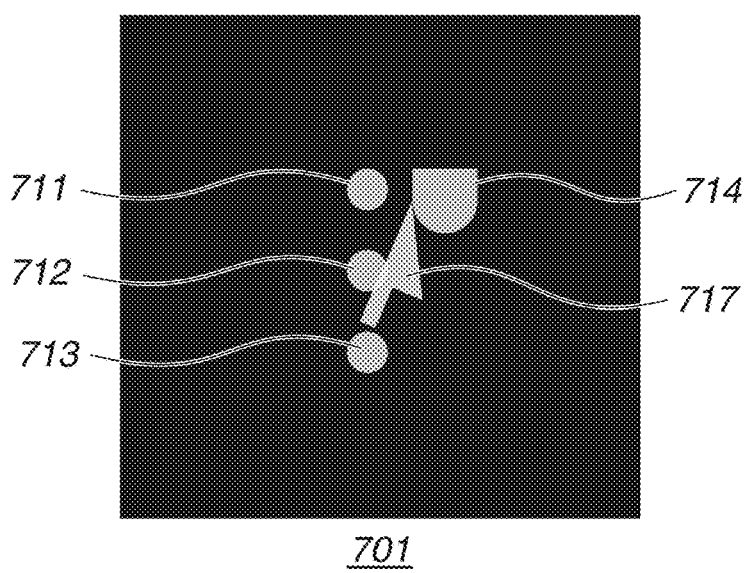
FIGS. 7A to 7C illustrate the camera system according to the first exemplary embodiment.
Figure 7B:
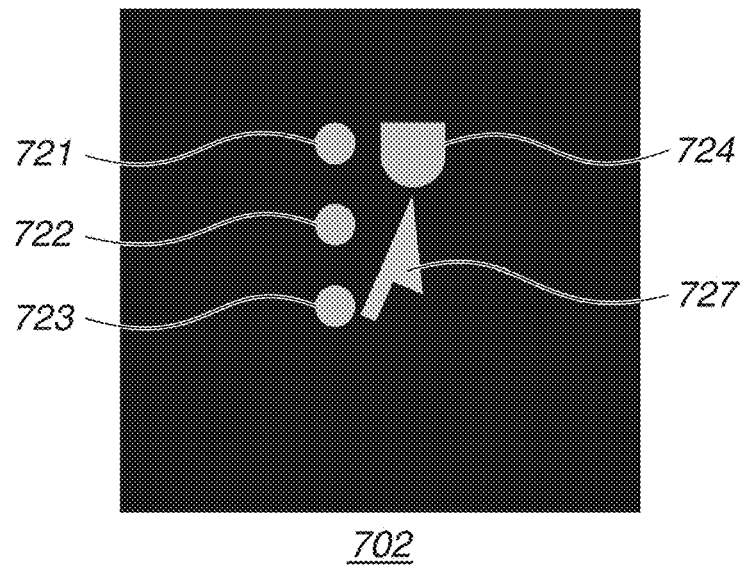
Figure 7C:
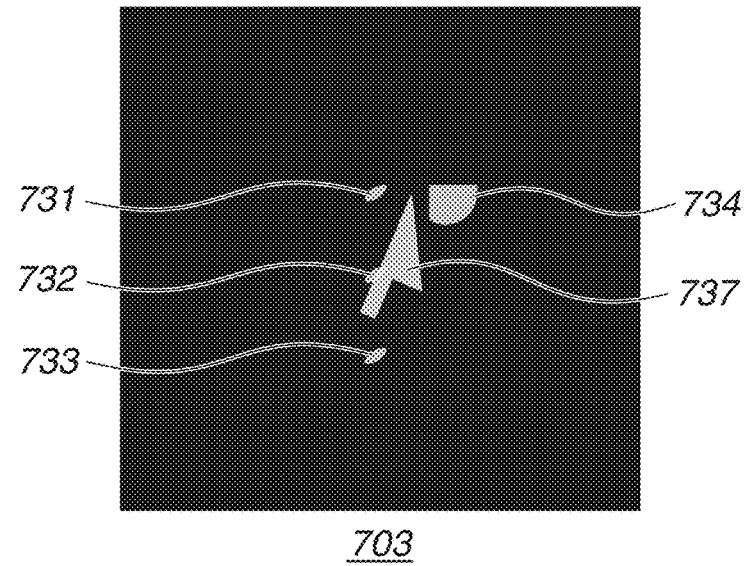

FIG. 7A illustrates an image 701 that is temporally consecutive to the image 306 illustrated in FIG. 3C. In other words, the temporally consecutive image 701 is an image of a continuous frame. FIG. 7B illustrates an image 702 that is not temporally consecutive to the image 306 illustrated in FIG. 3C. In the case of removing the signal belonging to Gr1 from the image 306, the following processing is performed. The signal located at the same coordinates as the decorative object images 321 to 324 is selected from one of the image 701 and the image 702. The selected signal is replaced with the signal corresponding to each of the decorative object images 321 to 324 in the image 306, thereby making it possible to remove the signal belonging to Gr1. In this case, the image 701 or the image 702 is also referred to as a frame to be replaced.

In the present exemplary embodiment, the image 702 is selected rather than the image 701 as the frame to be replaced. In a case of selecting the image 701, some of the decorative object images 321 to 324 may be left as indicated in an image 703 illustrated in FIG. 7C. The use of the image, such as the image 702, in which the decorative objects 301 to 304 move to a larger extent than the concealed object 107, facilitates the removal of an undesired signal from the image 306. The image, such as the image 702, can be extracted based on the above-described movement vectors.

Another removal method is, for example, a method of replacing the signal belonging to Gr1 based on a surrounding signal of each feature. In one embodiment, this method may be used in a case where the size of each feature to be removed is smaller than the number of pixels of the image. Specifically, the signal belonging to Gr1 is replaced with an average value or median of pixel values of a background image. Alternatively, information about the shape of a portion that is not replaced can be interpolated by performing interpolation processing based on the signal belonging to Gr2, which is not a correction target. As a removal method, any combination of the above-described methods can be used.

Processing to be performed after step S204 includes the following processing. That is, a shape or object can be identified using the feature belonging to Gr2. Alternatively, a shape or object can also be identified by extracting features again using an image based on the signal belonging to Gr2.

The number of groups into which features are classified is not limited to two, but instead may be three or more groups may be provided. In this case, a plurality of groups can be selected as groups to be removed from an image. Alternatively, the images from which groups have been removed may be compared and the groups to be removed may be identified.

The processing described above makes it possible to acquire the terahertz image in which noise is reduced. The use of the terahertz image in which noise is reduced makes it possible to improve the accuracy of the camera system. Further, the processing according to the present exemplary embodiment facilitates calculation processing and feature classification processing.

A second exemplary embodiment differs from the first exemplary embodiment in that a movement frequency is used as motion information instead of a movement speed. In the following description, the description of processing similar to that in the first exemplary embodiment is omitted.

FIG. 8 is a flowchart illustrating processing in the image processing apparatus 101 according to the second exemplary embodiment. Steps S201, S202, and S204 are similar to those in the first exemplary embodiment. In the present exemplary embodiment, after step S202, step S801 is provided to perform Fourier Transform (FT) of a time variation in the movement amount of each feature. The movement frequency of each feature can be obtained by performing FT of a time variation in the movement amount of each feature. That is, the movement frequency of each feature is used as motion information (feature amount) about each feature.

Figure 9A:
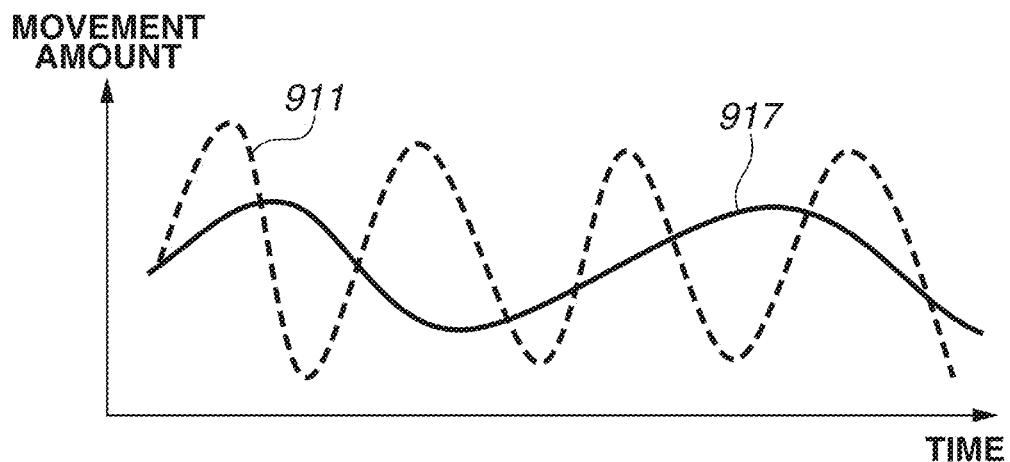
FIGS. 9A and 9B are schematic graphs illustrating an operation of the camera system according to the second exemplary embodiment.

FIG. 9A is a schematic graph illustrating a time variation in the movement amount of two features with different movement cycles. A movement amount 911 indicates, for example, the movement amount of the feature 331. The movement amount 911 can be obtained by tracing the movement of the feature 331 or the decorative object image 321. The movement tracing can be performed using a plurality of images captured at different times. The movement amount 911 is, for example, a time variation in the movement amount of a button on clothes. Not only the movement amount of a button, but also the movement amount of wrinkles in a pocket or clothes may be used. A movement amount 917 indicates, for example, the movement amount of the feature 337. The movement amount 917 can be obtained by tracing the movement of the feature 337 or the concealed object image 327. The movement amount 917 is a time variation in the movement amount of the object 106, such as a person, or a time variation in the movement amount of the concealed object 107 owned by the object 106. In a case where the movement amount 917 indicates the movement amount of the object 106, if the concealed object 107 does not move relatively to the object 106, for example, the object 106 is an article and the concealed object 107 is a fixed article. In a case where the movement amount 917 indicates the movement amount of the concealed object 107, if the concealed object 107 is moving relatively to the object 106, for example, the object 106 is a person and the concealed object 107 is moved due to breathing of the person.

Figure 9B:
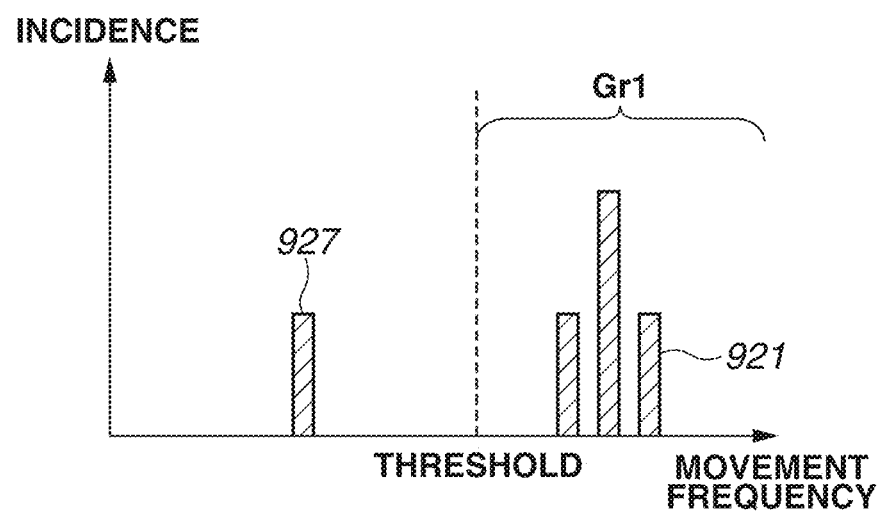

FIG. 9B is a schematic graph illustrating a histogram of the movement frequency of each feature. A movement frequency 921 is extracted by performing FT of the movement amount 911. A movement frequency 927 is extracted by performing FT of the movement amount 917. In this case, the movement frequency 921 is higher than the movement frequency 927. The feature 331 corresponding to the movement frequency 921 is attached to the coating material 105 and fluctuates due to vibrations of the clothes, and thus has a high frequency.

In step S802, it is determined whether the extracted movement frequency is more than or equal to a threshold. If the movement frequency of the feature is more than or equal to the threshold (YES in step S802), the processing proceeds to step S602. In step S602, the feature is classified into Gr1. If the movement frequency of the feature is less than the threshold (NO in step S802), the processing proceeds to step S603. In step S603, the feature is classified into Gr2. In the present exemplary embodiment, for example, an up-and-down movement cycle of about 1 Hz of the center of mass of the person during walking, or a time variation of about 20 times/min in the breast of the person due to breathing, is set as the threshold. Alternatively, the threshold may be set based on the number or distribution of features with a high frequency. In the case of FIG. 9B, the feature 331 and the other features 332, 333, and 334 have a high frequency and are classified into Gr1, and the feature 337 is classified into Gr2.

After that, as illustrated in FIGS. 2 and 6, in step S204, the signal belonging to Gr1 is removed from the terahertz image. The processing described above makes it possible to acquire the terahertz image in which noise is reduced. The use of the terahertz image in which noise is reduced makes it possible to improve the accuracy of the camera system. The processing according to the present exemplary embodiment facilitates the feature classification processing regardless of the magnitude of the movement speed of an object.

In a third exemplary embodiment, a camera system that is different from the camera system according to the first exemplary embodiment is used. Specifically, in the present exemplary embodiment, a visible light camera is provided and feature classification processing is performed using a visible light image. In the following description, the description of processing similar to that in the first exemplary embodiment is omitted.

Figure 10:
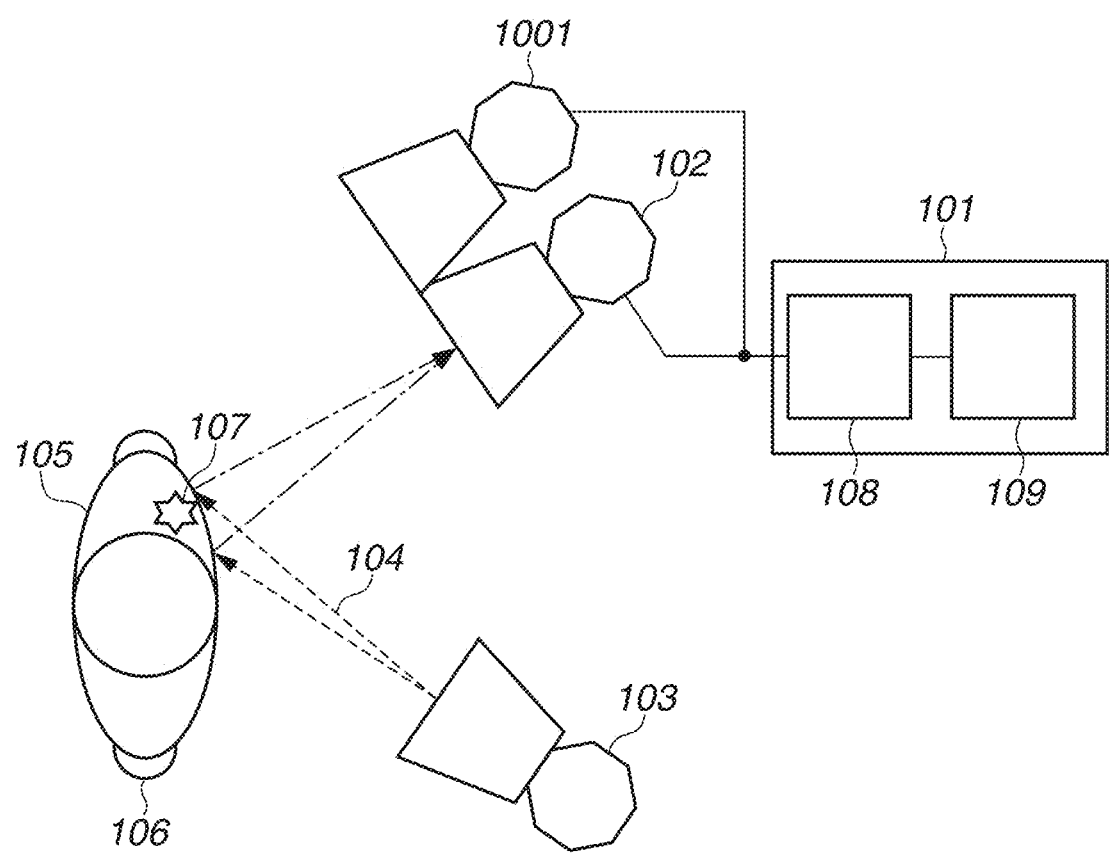
FIG. 10 illustrates a camera system according to a third exemplary embodiment.

FIG. 10 illustrates the camera system according to the third exemplary embodiment. The camera system according to the present exemplary embodiment includes a camera 1001 for visible light, in addition to the configuration of the camera system according to the first exemplary embodiment. The camera 1001 can be placed at a location adjacent to the reception unit 102. A visible image with an angle of view or orientation similar to that of the terahertz image can be acquired. The image generation unit 108 generates an image from a signal based on the terahertz wave output from the reception unit 102, and generates an image from a signal based on the visible light output from the camera 1001. Assume herein that the image generated from the signal based on the terahertz wave is referred to as a terahertz image, and the image generated from the signal based on the visible light is referred to as a visible image. For example, the terahertz wave includes a wavelength in a frequency band of 0.1 THz or more and 30 THz or less, and the visible light includes a wavelength of 300 nm or more and 750 nm or less. In the present exemplary embodiment, the terahertz wave and visible light are used, but instead two types of images based on electromagnetic waves in different frequency bands (i.e., wavelength bands) can be used. The different frequency bands may partially include an overlapping portion.

Figure 11:
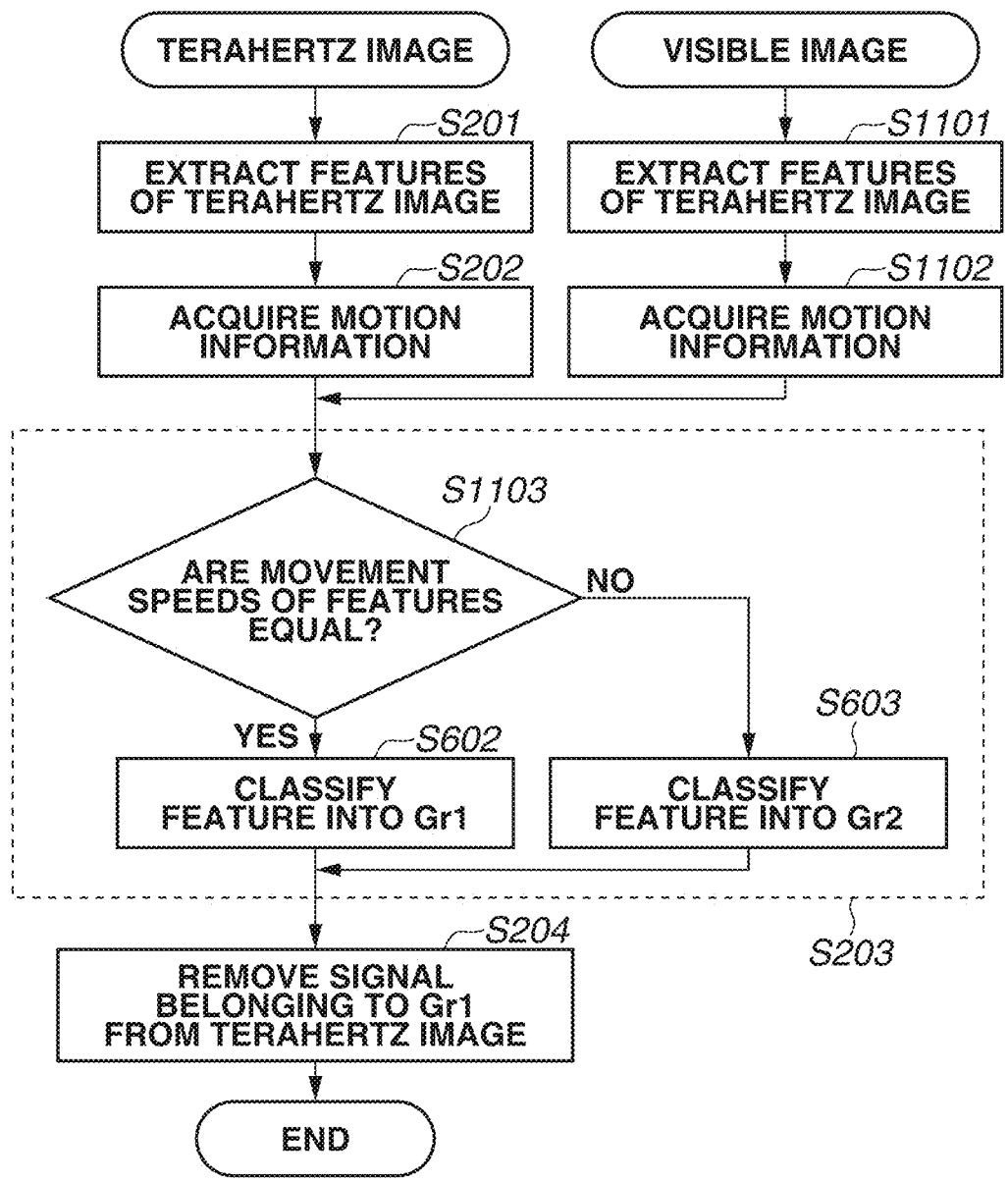
FIG. 11 is a flowchart illustrating an operation of the camera system according to the third exemplary embodiment.

FIG. 11 is a flowchart illustrating processing performed in the image processing apparatus 101 according to the present exemplary embodiment. Steps S201, S202, and S204 are similar to those in the first exemplary embodiment. The processing according to the present exemplary embodiment differs from the processing according to the first exemplary embodiment illustrated in FIG. 2 in regard to step S1101, step S1102, and the classification step S203.

In parallel with steps S201 and S202, the signal from the camera 1001 is processed. In step S1101, features of the visible image generated by the image generation unit 108 are extracted. Examples of a feature extraction method include the known feature extraction method as described in the first exemplary embodiment. Alternatively, methods other than the method can also be used. Furthermore, a method different from the method used in step S201 to extract features of the terahertz image may be adopted. For example, since the visible light is reflected by the coating material 105, a specific pattern on the surface of the coating material 105 may be extracted as the features.

In step S1102, motion information about the features of the visible image is acquired. The motion information is a velocity vector of each feature. Examples of a method for acquiring the motion information include the known motion information acquisition method as described in the first exemplary embodiment. Alternatively, methods other than the method can also be used. Further, a method different from the method used in step S202 to acquire the motion information about the features of the terahertz image may be adopted. For example, in the case of extracting a pattern as the features, the motion information can also be acquired by tracing the outer edge of the pattern.

Based on the results of steps S202 and S1102, the features are classified in step S203. In step S203, the motion information about the features of the terahertz image is compared with the motion information about the features of the visible image. Specifically, in step S1103, it is determined whether the movement speeds of the features of the two images are equal. If the movement speeds of the features are equal (YES in step S1103), the processing proceeds to step S602. In step S602, each of the features is classified into Gr1. If the movement speeds of the features are not equal (NO in step S1103), the processing proceeds to step S603. In step S603, each of the features is classified into Gr2. In the classification processing, not only the method using the movement speed of each feature, but also a method of referring to motion information about the features of the terahertz image corresponding to the features selected from the visible image can be used.

The visible image has a higher resolution than that of the terahertz image. Thus, in the visible image, the shape or a portion, such as a body or an arm, of the object 106 can be recognized by applying a known object recognition technique. In other words, processing to be performed depending on a specific cycle or speed on the portion, such as setting of a threshold depending on the cycle of breathing, can be performed, for example, on an area recognized as the body of the person by identifying the shape or target of the object 106 by using the visible image. Further, each processing area can be divided for each object that moves at an individual speed or cycle, and a threshold for classification and classification conditions for each processing area can be changed, to thereby improve the classification accuracy. Each processing area can be determined with a predetermined size. It is also possible to perform the processing by reducing the number of pieces of unnecessary information by selecting an area corresponding to an object from each processing area. Thus, the processing load can be reduced and high-speed processing can be achieved as compared with the case of processing the entire image. According to the present exemplary embodiment, at least one of these beneficial effects can be achieved.

According to the present exemplary embodiment, the use of a visible image having a higher resolution and less noise than in a terahertz image makes it possible to improve the feature extraction accuracy and the accuracy of motion information about features.

A fourth exemplary embodiment illustrates an example where a machine learning model is generated when the machine learning model is used in the determination step. The use of the machine learning model in the determination step makes it possible to improve the determination accuracy. In the following description, descriptions of components in the fourth exemplary embodiment that are similar to those in the other exemplary embodiments are omitted.

Figure 12:
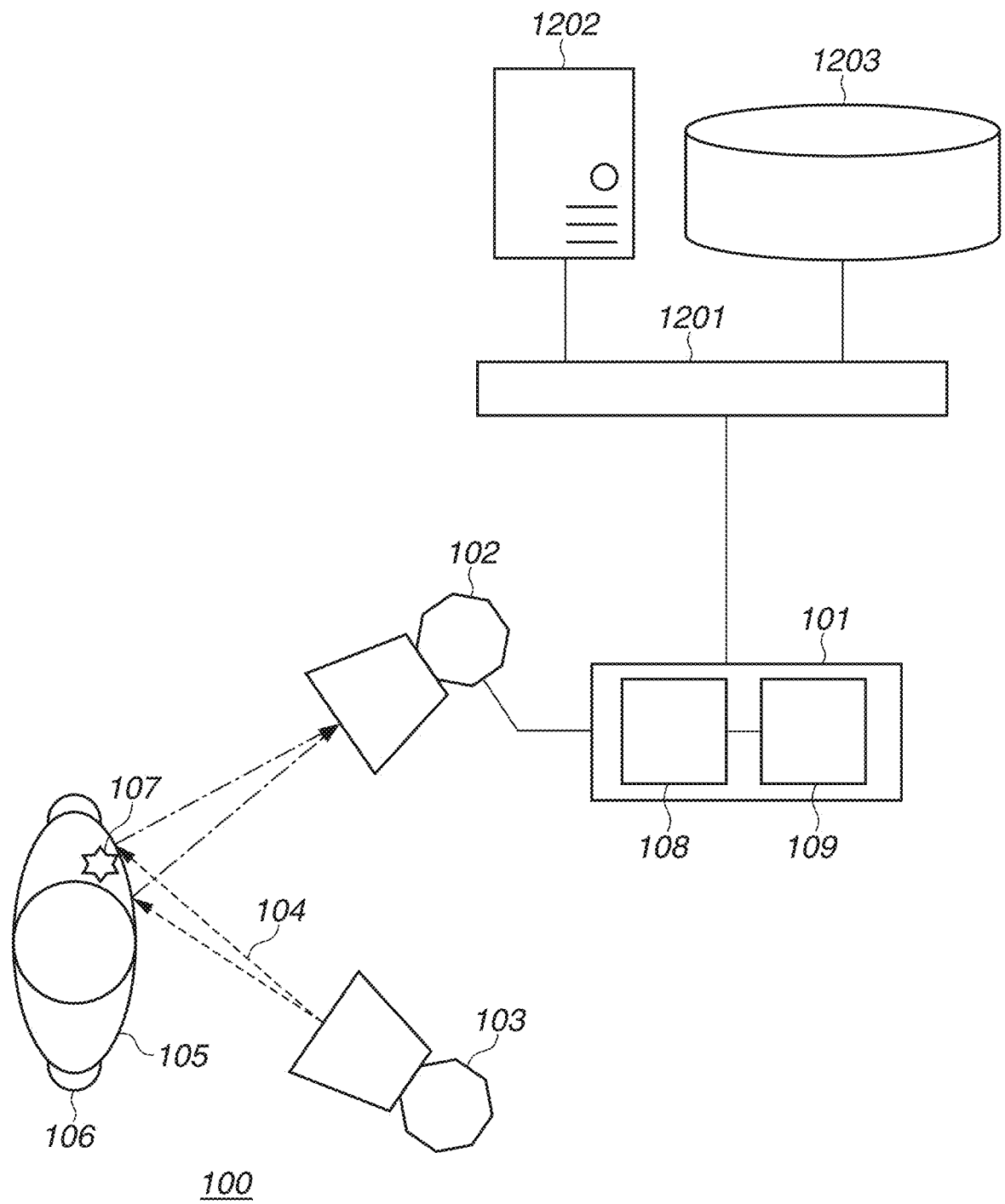
FIG. 12 illustrates a camera system according to a fourth exemplary embodiment.

FIG. 12 illustrates a basic configuration of a camera system according to the fourth exemplary embodiment. The configuration according to the fourth exemplary embodiment differs from the configuration according to the first exemplary embodiment illustrated in FIG. 1 in that the image processing apparatus 101 is electrically connected to each of a learning server 1202 and a data collection server 1203. In the present exemplary embodiment, the image processing apparatus 101 is connected to each of the learning server 1202 and the data collection server 1203 via a network 1201. Although not illustrated in FIG. 12, the camera system can be additionally provided with the visible camera 1001 described above with reference to FIG. 10 and an environment parameter measurement device for measuring an environment parameter to be described below. The data collection server 1203 is a server that stores images generated by the image processing apparatus 101 and learning data 1700 described below. The learning server 1202 is a server that performs learning and estimation for classifying the features into groups (e.g., Gr1 and Gr2) as described above. Hereinafter, learning is also referred to as a learning phase and estimation is also referred to as an estimation phase. The learning phase and the estimation phase will be described with reference to FIGS. 13 to 17B.

Figure 13:
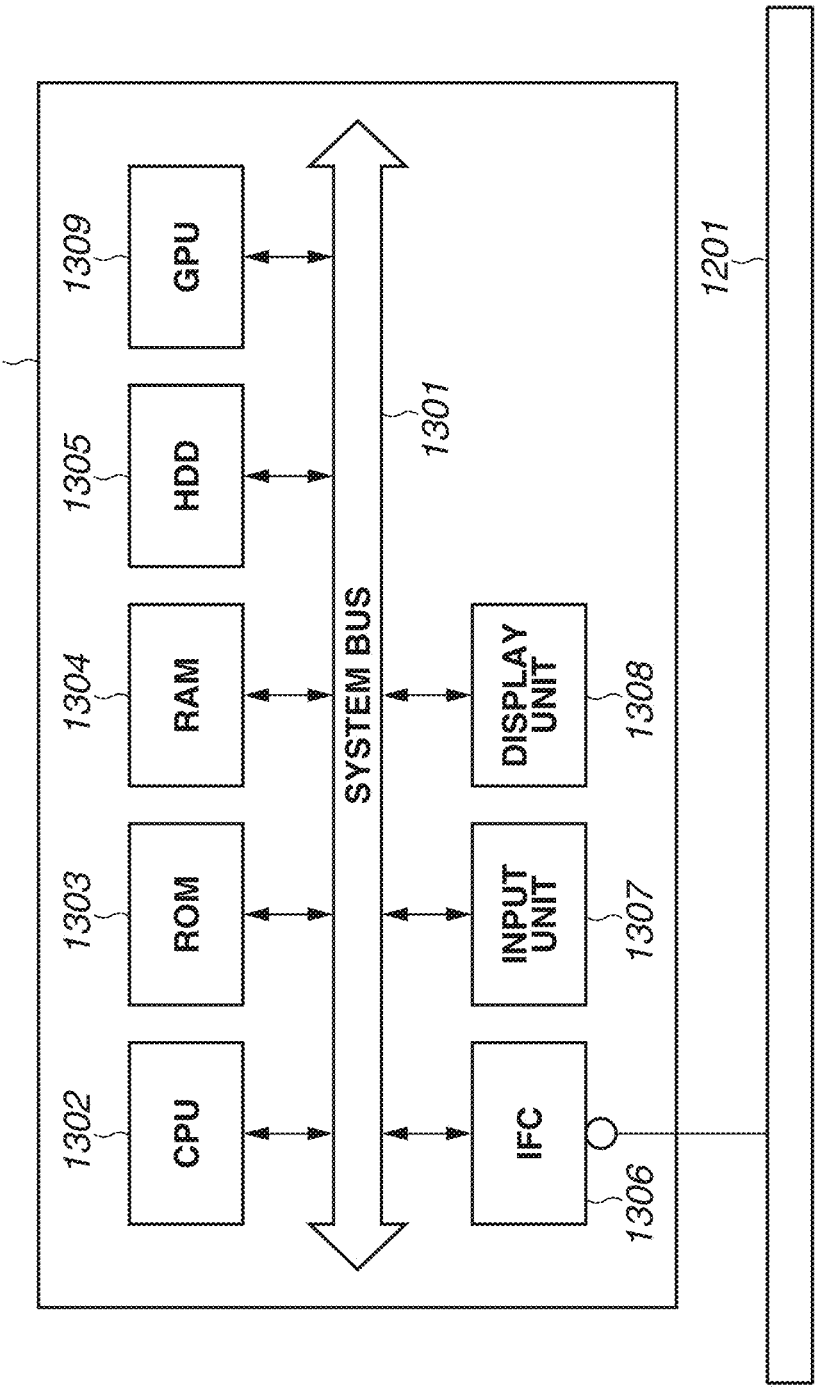
FIG. 13 is a block diagram illustrating a hardware configuration of the camera system according to the fourth exemplary embodiment.

FIG. 13 is a block diagram illustrating an example of a configuration of an information processing apparatus 1300. The information processing apparatus 1300 may be, for example, the image processing apparatus 101, the learning server 1202, or the data collection server 1203. The information processing apparatus 1300 includes a central processing unit (CPU) 1302, a read-only memory (ROM) 1303, and a random access memory (RAM) 1304. The information processing apparatus 1300 includes a hard disk drive (HDD) 1305, a graphics processing unit (GPU) 1309, and an Interface Control (IFC) 1306. The information processing apparatus 1300 further includes an input unit 1307 and a display unit 1308. These components are disposed on a system bus 1301. The present exemplary embodiment illustrates an example where the image processing apparatus 101, the learning server 1202, and the data collection server 1203 have the configuration illustrated in FIG. 13. However, the configuration is not limited to this example.

Figure 14:
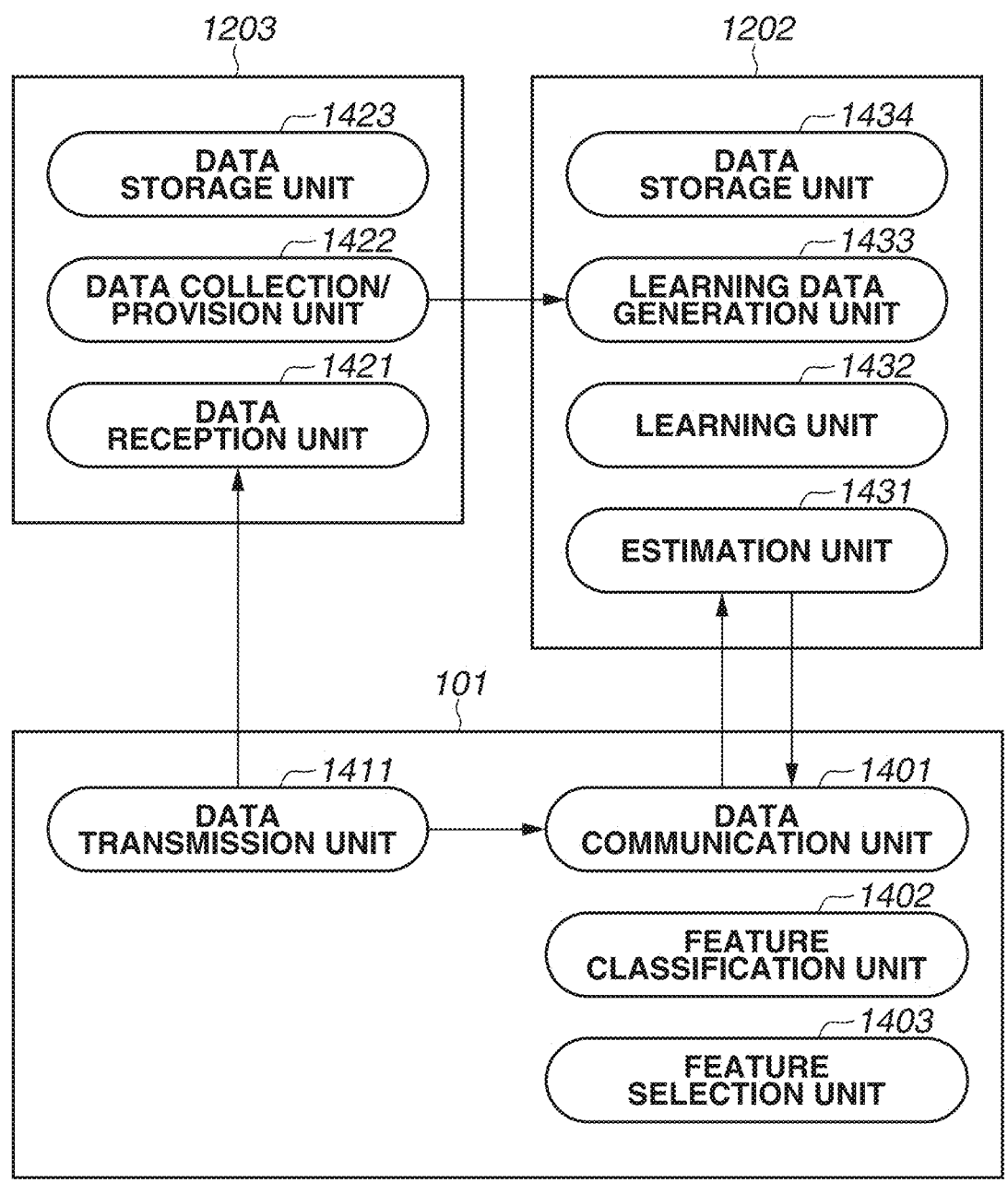
FIG. 14 is a block diagram illustrating a software configuration of the camera system according to the fourth exemplary embodiment.
Figure 15:
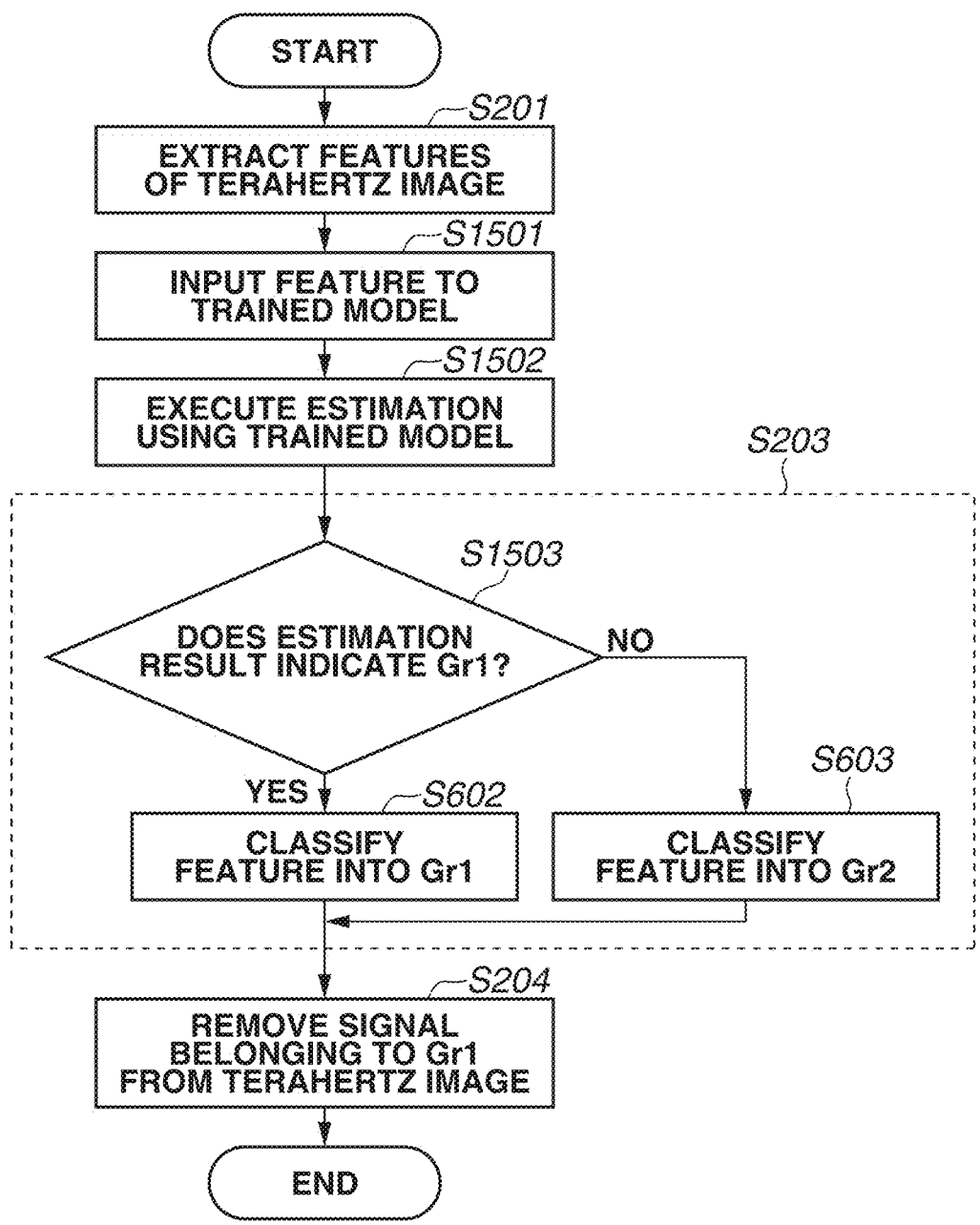
FIG. 15 is a flowchart illustrating an operation of the camera system according to the fourth exemplary embodiment.
Figure 17A:
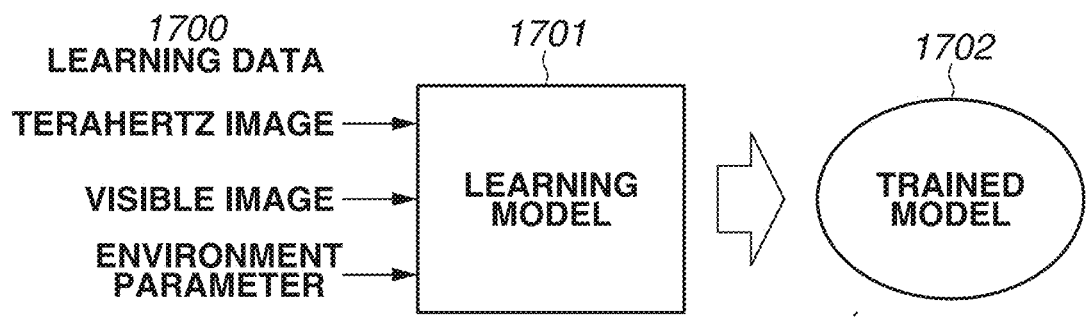
FIGS. 17A and 17B each illustrate a learning model used in the camera system according to the fourth exemplary embodiment.
Figure 17B:
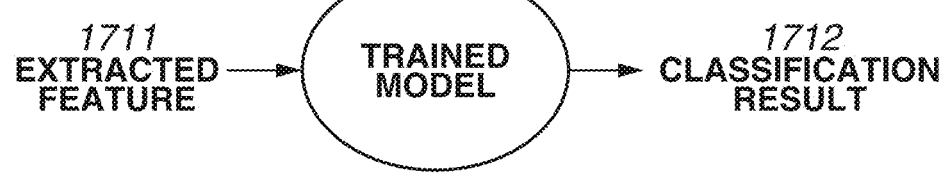

FIG. 14 is a block diagram illustrating a configuration of each of the image processing apparatus 101, the learning server 1202, and the data collection server 1203, and exchange of information in the learning phase and the estimation phase. FIG. 15 is a flowchart illustrating an estimation processing flow in the estimation phase. Steps S201 and S204 illustrated in FIG. 15 are similar to those in the first exemplary embodiment, and thus the descriptions thereof are omitted in the present exemplary embodiment. While processing similar to that in the first exemplary embodiment is carried out in the present exemplary embodiment, the present exemplary embodiment can also be applied to the method of processing the visible image as illustrated in FIG. 11. FIG. 16 is a flowchart illustrating a learning processing flow in the learning phase. FIG. 17A is a conceptual diagram illustrating the learning phase, and FIG. 17B is a conceptual diagram illustrating the estimation phase.

The estimation phase will now be described. The outline of the estimation phase is mainly illustrated in FIGS. 15 and 17B. In the estimation phase, a feature 1711 extracted from the terahertz image obtained by capturing an image of the object 106 covered with the coating material 105 and the concealed object 107 is input to a trained model 1702. A classification result 1712 obtained as a result of classifying the feature 1711 into one of two groups is output. This processing will be described in more detail. An algorithm for carrying out the processing flow illustrated in FIG. 15 is stored in the HDD 1305 or the ROM 1303 of the image processing apparatus 101 and the learning server 1202. The algorithm is loaded into the RAM 1304 and is executed by the CPU 1302 or the GPU 1309. In step S201, the image processing apparatus 101 extracts the feature from an image based on the electromagnetic wave stored in the HDD 1305 or the ROM 1303. The feature is transmitted to the learning server 1202 via the IFC 1306 and the network 1201. In step S1501, the learning server 1202 stores the feature in the HDD 1305 or the ROM 1303, and inputs the feature to the trained model 1702. This feature corresponds to the extracted feature 1711 illustrated in FIG. 17B. In step S1502, the learning server 1202 executes the estimation using the trained model 1702. The learning server 1202 outputs the classification result 1712 based on the estimation. The classification result 1712 is input to the image processing apparatus 101 via the IFC 1306 and the network 1201. The classification result 1712 is stored in the HDD 1305 or the ROM 1303 of the image processing apparatus 101. In step S203, the CPU 1302 and the GPU 1309 in the image processing apparatus 101 classify the feature based on the classification result 1712. In step S204, the image processing apparatus 101 removes the signal belonging to Gr1 from the image. Thus, the estimation phase is executed.

The learning phase will now be described. The outline of the learning phase is mainly illustrated in FIGS. 16 and 17A. In the learning phase, the learning data 1700 is input to the learning model 1701 to thereby generate the trained model 1702. Specifically, the trained model 1702 is obtained by performing learning to obtain an algorithm for the learning model 1701 with high accuracy by machine learning. The learning data 1700 includes a collected terahertz image. The learning data 1700 further includes a visible image corresponding to the terahertz image, and an environment parameter. The learning data 1700 can be data obtained by processing collected images or parameters, or can be extracted data. The learning data 1700 can also include training data.

A specific processing flow will be described. In step S1601, the learning server 1202 requests the data collection server 1203 to transmit the learning data 1700. In step S1602, upon receiving the request, the data collection server 1203 transmits the learning data 1700 to the learning server 1202. In this case, the learning data 1700 is stored in a data storage unit 1423 of the data collection server 1203. When the request is received, the learning data 1700 is transmitted to the learning server 1202 via, for example, a data collection/provision unit 1422, the IFC 1306, and the network 1201. In the learning server 1202, the learning data received by a learning data generation unit 1433 is stored in the data storage unit 1434.

In step S1603, the learning data 1700 is input to the learning model 1701, and in step S1604, learning is executed. In the learning phase, the trained model 1702 is generated. The learning model 1701 includes an algorithm for classifying features into two groups (Gr1 and Gr2).

The algorithm illustrated in FIG. 17B is stored in the HDD 1305 or the ROM 1303 of the data collection server 1203 or the learning server 1202. The algorithm is loaded into the RAM 1304 and is executed by the CPU 1302 or the GPU 1309.

Machine learning is executed by the CPU 1302 and the GPU 1309 of the learning server 1202. The GPU 1309 can perform calculation processing effectively by performing parallel processing on a larger number of pieces of data. It may be therefore, the GPU 1309 is used when learning, such as deep learning, is performed a plurality of times using a learning model. In the present exemplary embodiment, the GPU 1309 is used in addition to the CPU 1302 in the processing to be executed by a learning unit 1532. Specifically, in the case of executing a learning program including a learning model, the CPU 1302 and the GPU 1309 perform calculation processing in cooperation with each other. In the processing to be executed by the learning unit 1532, one of the CPU 1302 and the GPU 1309 may perform calculation processing. The estimation unit 1531 may also use the GPU 1309 similarly to the learning unit 1532.

As a specific algorithm for machine learning, methods such as a nearest neighbor algorithm, a Naive Bayes method, a decision tree, and a support vector machine can be used. Further, deep learning that generates by itself a feature amount for learning and a coupling weighting coefficient may be performed by using a neural network. For example, a Convolutional Neural Network (CNN) model may be used as a deep learning model. Any one of available algorithms as described above can be used, as need, and can be applied to the present exemplary embodiment.

Machine learning enables learning (batch learning) in which learning is collectively performed using a preliminarily collected data set and features are classified using the same parameters in subsequent processing, and also enables real-time learning (online learning) in which learning is performed based on captured moving images. It is also possible to provide an intermediate learning mode every time a certain amount of data is accumulated. As learning data, image capturing data that is obtained in an environment suitable for learning data may be used, or data obtained in the same environment may be used, unlike in an inspection system to which this processing system is applied.

A learning data collection method will now be described. To collect a moving image based on an electromagnetic wave, the camera system described in the first exemplary embodiment and a known image capturing method can be used. An example where a terahertz wave is used as the electromagnetic wave will now be described. Assume that, in the present exemplary embodiment, a terahertz moving image obtained by capturing an image of a person wearing clothes is used as the terahertz image. To collect a visible moving image corresponding to the terahertz moving image, the camera system described in the third exemplary embodiment and a known image capturing method can be used. In this case, the visible moving image is captured with an angle of view equal or similar to that of the terahertz moving image, simultaneously with the terahertz moving image. The environment parameter for the moving image includes climatic conditions and information about vibrations of the clothes, which is a coating material. Examples of the climatic conditions include the temperature, humidity, and weather when the terahertz moving image is captured. Examples of the information about vibrations of the clothes include a body shape of a person, a wind speed, and the material of clothes. To collect the environment parameter, a known data collection method can be used. The environment parameter is not limited to that described above, but instead other various types of data may be used. Supervised data may be used as the learning data. The learning data is collected by the data collection server 1203 via the network 1201.

The disclosure can also be implemented by processing in which a program for implementing functions according to the above-described exemplary embodiments is supplied to a system or an apparatus via a network or a storage medium, and a computer in the system or apparatus reads out and executes the program. The computer includes one or more processors or circuits, and may include a plurality of separate computers, a plurality of separate processors, or a circuit network so as to read out and execute a computer-executable instruction. For example, the processors or circuits may include a CPU, a micro processing unit (MPU), a GPU, and an application specific integrated circuit (ASIC). For example, the processors or circuits may include a field-programmable gate array (FPGA), a digital signal processor (DSP), a data flow processor (DFP), or a neural processing unit (NPU).

Figure 18A:
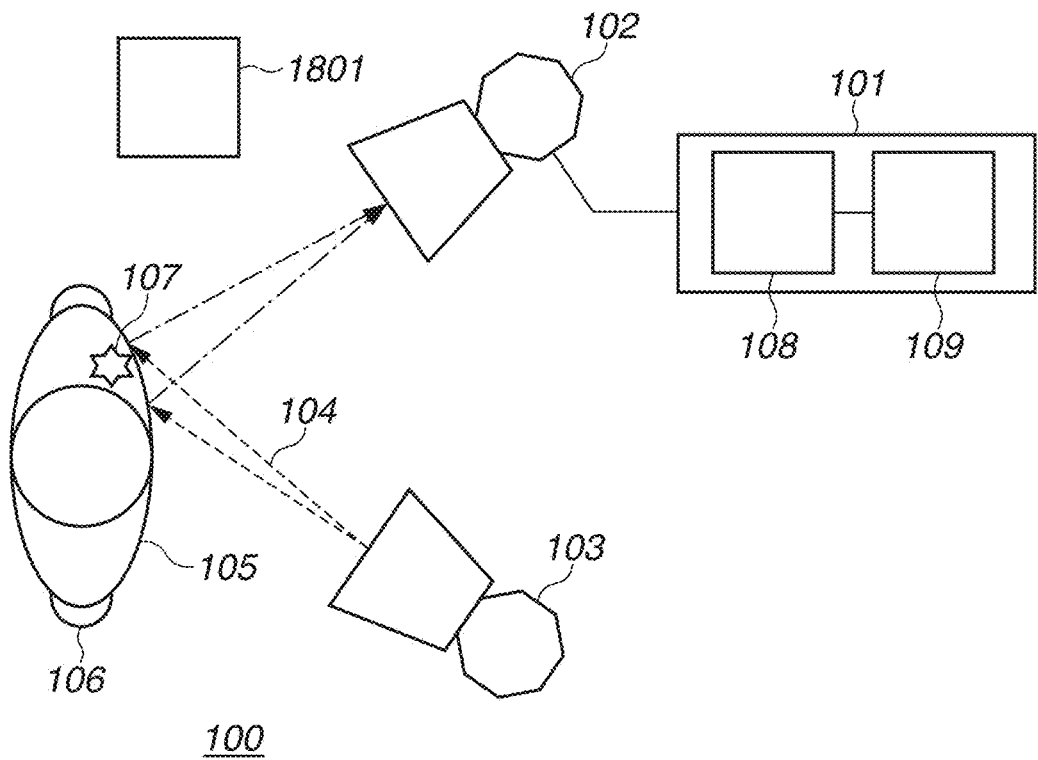
FIGS. 18A and 18B each illustrate a camera system according to a fifth exemplary embodiment.
Figure 18B:
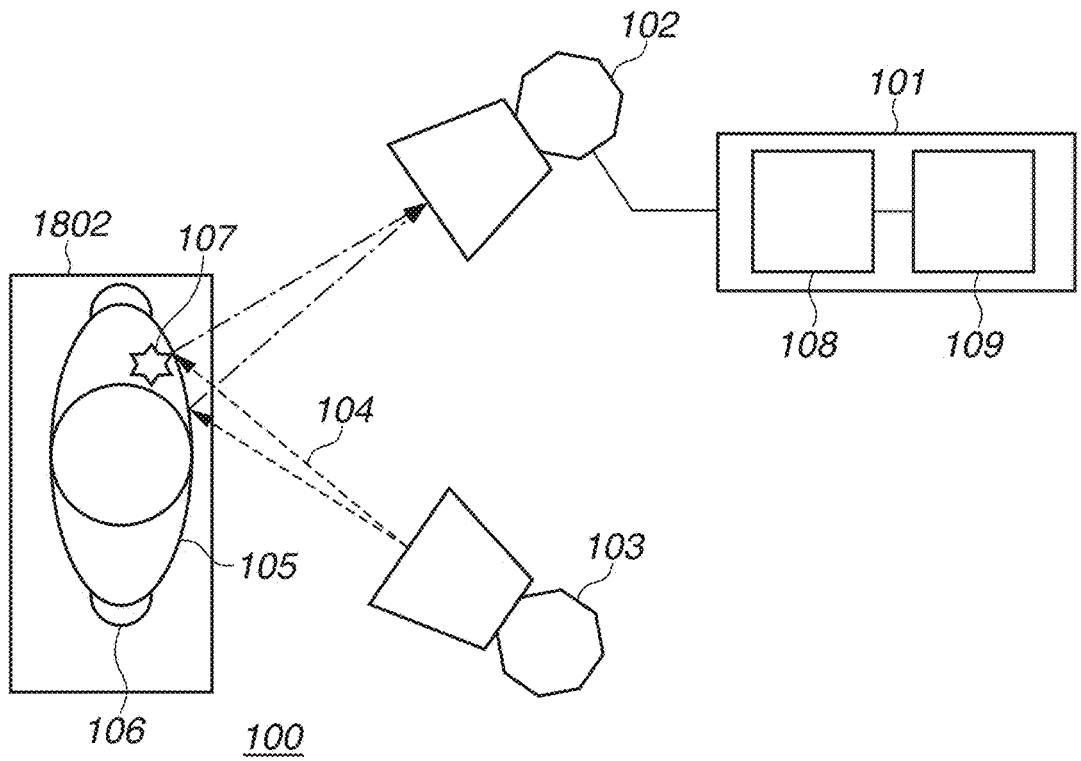

A fifth exemplary embodiment illustrates an example where a vibratory unit that applies a mechanical vibration to an object during capturing of an image based on an electromagnetic wave is used to achieve an improvement in classification accuracy. The descriptions of parts in the fifth embodiment that are similar to those in the above-described exemplary embodiments are omitted. FIGS. 18A and 18B each illustrate an example of a camera system according to the present exemplary embodiment.

The camera system illustrated in FIG. 18A includes a wind-powered device 1801, in addition to the configuration described in the first exemplary embodiment. The wind-powered device 1801 is composed of, for example, a fan or an air conditioner, which enables the coating material 105 to vibrate with wind. With this configuration, the difference in the movement speed or movement frequency among the coating material 105, the object 106, and the concealed object 107 can be increased, thereby making it possible to improve the classification accuracy. The camera system illustrated in FIG. 18B includes a vibratory device 1802, in addition to the configuration described in the first exemplary embodiment. The vibratory device 1802 is provided below the object 106, but instead may be provided at any location as long as a vibration can be transmitted to the object 106. With this configuration, the object 106 is caused to vibrate, thereby enabling the vibratory device 1802 to control the movement frequency or cycle of each of the object 106 and the concealed object 107. Thus, an improvement in classification accuracy due to the difference in the movement frequency is achieved. As described above, the air flow of the wind-powered device 1801 and the frequency of the vibratory device 1802 are reflected in the setting of the threshold for classification and the learning data 1700 during machine learning, thereby achieving an improvement in classification accuracy.

FIGS. 18A and 18B illustrate the wind-powered device 1801 and the vibratory device 1802, respectively, as examples of the device for applying a vibration. Alternatively, a device that allows the object 106 to actively vibrate may be placed. For example, a step is provided (a step device is provided) on a walkway for the object 106, thereby making it possible to induce ascending and descending motions of the object 106. The step device can be implemented in an inspection system with more simplicity and lower cost than a system using the wind-powered device 1801 or a system using the vibratory device 1802.

According to the exemplary embodiments, the use of a visible image having a higher resolution and less noise than in a terahertz image makes it possible to improve the feature extraction accuracy and the accuracy of extracting motion information about features. The exemplary embodiments can be arbitrarily changed or combined. The processing in the image processing apparatus 101, the data collection server 1203, and the learning server 1202 is not limited to the processing described above. The image processing apparatus 101 can receive a trained model from the learning server 1202, and the image processing apparatus 101 can execute the estimation phase. Further, the estimation phase and the learning phase can also be performed on a cloud system. While the movement speed and the movement frequency are illustrated as examples of the motion information, any other information can also be used.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

while the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-069430, filed Apr. 7, 2020, which is hereby incorporated by reference herein in its entirety.

What is claimed is:

1. An apparatus comprising:
a processor; and
a memory coupled to the processor storing instructions that, when executed by the processor, cause the processor to function as:
a first extract unit configured to extract features of a first image based on an electromagnetic wave in a first frequency band, wherein the first image includes a signal based on a concealed object and a signal based on an object, the signals based on the concealed object and the object having been outputted by irradiating the object with the concealed object with the electromagnetic wave and being superimposed;
a first acquire unit configured to acquire motion information about the features of the first image;
a classify unit configured to classify the features of the first image into a first group and a second group based on the motion information; and
a remove unit configured to remove, from the first image, a signal corresponding to a feature of the first image that belongs to the first group.

2. The apparatus according to claim 1,
wherein the motion information about the features of the first image is a movement amount of each of the features of the first image, and
wherein the classify unit classifies the features of the first image depending on whether the movement amount of each of the features of the first image is more than or equal to a threshold.

3. The apparatus according to claim 2, wherein the motion information about the features of the first image is acquired from two or more of the first images captured at different times.

4. The apparatus according to claim 1,
wherein the motion information about the features of the first image is a movement frequency of each of the features of the first image, and
wherein the classify unit classifies the features of the first image depending on whether the movement frequency of each of the features of the first image is more than or equal to a threshold.

5. The apparatus according to claim 1, wherein the processor further functions as a second acquire unit configured to acquire the first image,
wherein the second acquire unit includes:
a radiation unit configured to radiate the electromagnetic wave in the first frequency band; and
a reception unit configured to receive the electromagnetic wave in the first frequency band.

6. The apparatus according to claim 1, the processor further functions as:
a second unit configured to extract features of a second image based on visible light in a second frequency band; and
a third acquire unit configured to acquire motion information about the features of the second image.

7. The apparatus according to claim 6,
wherein the motion information about the features of the second image is a movement amount of each of the features of the second image, and
wherein the classify unit compares the movement amount of each of the features of the first image with the movement amount of each of the features of the second image, and classifies the features of the first image depending on whether the movement amounts are equal.

8. The apparatus according to claim 6,
wherein the motion information about the features of the second image is a movement frequency of each of the features of the second image, and
wherein the classify unit compares the movement frequency of each of the features of the first image with the movement frequency of each of the features of the second image, and classifies the features of the first image depending on whether the movement frequencies are equal.

9. The apparatus according to claim 6, wherein the motion information about the features of the second image is obtained from two or more of the second images acquired at different times.

10. The apparatus according to claim 6,
wherein the classify unit performs processing on each of processing areas obtained by dividing the first image into a predetermined size, and
wherein the processing areas are determined based on the features of the second image.

11. The apparatus according to claim 1, wherein the classify unit inputs the first image to a learning model to estimate a classification of each of the features from the first image.

12. The apparatus according to claim 11, wherein the learning model is generated by performing machine learning based on an input of training data.

13. The apparatus according to claim 1, wherein the remove unit replaces at least the signal belonging to the first group with a signal located at the same coordinates in another frame.

14. The apparatus according to claim 1, wherein the remove unit replaces at least the signal belonging to the first group with a value based on a surrounding signal.

15. The apparatus according to claim 1, further comprising a vibratory unit configured to apply a mechanical vibration to an object during capturing of the first image.

16. The apparatus according to claim 15, wherein the vibratory unit is at least one of a wind-powered device, a vibratory device, and a step device.

17. The apparatus according to claim 1, wherein the electromagnetic wave in the first frequency band is a terahertz wave.

18. The apparatus according to claim 1, wherein the signal corresponding to the feature of the first image that belongs to the first group includes the signal based on the concealed object.

19. The apparatus according to claim 1, wherein the concealed object has a plurality of decorative objects.

20. A method comprising:
    extracting features of a first image based on an electromagnetic wave in a first frequency band, wherein the first image includes a signal based on a concealed object and a signal based on an object, the signals based on the concealed object and the object having been outputted by irradiating the object with the concealed object with the electromagnetic wave and being superimposed;
    acquiring motion information about the features of the first image;
    classifying the features of the first image into a first group and a second group based on the motion information; and
    removing, from the first image, a signal corresponding to a feature of the first image that belongs to the first group.

21. The method according to claim 20, wherein the signal corresponding to the feature of the first image that belongs to the first group includes the signal based on the concealed object.

22. A computer-readable storage medium storing a program for causing a computer to execute a method, the method comprising:
    extracting features of a first image based on an electromagnetic wave in a first frequency band, wherein the first image includes a signal based on a concealed object and a signal based on an object, the signals based on the concealed object and the object having been outputted by irradiating the object with the concealed object with the electromagnetic wave and being superimposed;
    acquiring motion information about the features of the first image;
    classifying the features of the first image into a first group and a second group based on the motion information; and
    removing, from the first image, a signal corresponding to a feature of the first image that belongs to the first group.

23. The computer-readable storage medium according to claim 22, wherein the signal corresponding to the feature of the first image that belongs to the first group includes the signal based on the concealed object.

24. An apparatus comprising:
    a processor; and
    a memory coupled to the processor storing instructions that, when executed by the processor, cause the processor to function as:
    a first extract unit configured to extract features of a first image based on an electromagnetic wave in a first frequency band;
    a first acquire unit configured to acquire motion information about the features of the first image;
    a classify unit configured to classify the features of the first image into a first group and a second group based on the motion information;
    a remove unit configured to remove, from the first image, a signal corresponding to a feature of the first image that belongs to the first group;
    a second unit configured to extract features of a second image based on visible light in a second frequency band; and
    a third acquire unit configured to acquire motion information about the features of the second image.

25. The apparatus according to claim 24, wherein the electromagnetic wave in the first frequency band is a terahertz wave.

26. An apparatus comprising:
    a processor; and
    a memory coupled to the processor storing instructions that, when executed by the processor, cause the processor to function as:
    a first extract unit configured to extract features of a first image based on an electromagnetic wave in a first frequency band;
    a first acquire unit configured to acquire motion information about the features of the first image;
    a classify unit configured to classify the features of the first image into a first group and a second group based on the motion information;
    a remove unit configured to remove, from the first image, a signal corresponding to a feature of the first image that belongs to the first group; and
    a vibratory unit configured to apply a mechanical vibration to an object during capturing of the first image.

27. The apparatus according to claim 26, wherein the electromagnetic wave in the first frequency band is a terahertz wave.

* * * * *